US008694749B2

(12) United States Patent
Yamamoto et al.

(10) Patent No.: US 8,694,749 B2
(45) Date of Patent: *Apr. 8, 2014

(54) CONTROL METHOD OF DEVICE IN STORAGE SYSTEM FOR VIRTUALIZATION

(75) Inventors: Yasutomo Yamamoto, Sagamihara (JP); Hisao Honma, Odawara (JP); Ai Satoyama, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/484,420

(22) Filed: May 31, 2012

(65) Prior Publication Data

US 2012/0239829 A1  Sep. 20, 2012

Related U.S. Application Data

(63) Continuation of application No. 12/691,197, filed on Jan. 21, 2010, now Pat. No. 8,214,615, which is a continuation of application No. 11/254,798, filed on Oct. 21, 2005, now Pat. No. 7,673,110.

(30) Foreign Application Priority Data

Sep. 5, 2005 (JP) ................. 2005-255826

(51) Int. Cl.
*G06F 12/14* (2006.01)
(52) U.S. Cl.
USPC ........................... 711/165; 711/114; 711/170
(58) Field of Classification Search
None
See application file for complete search history.

(56) References Cited

U.S. PATENT DOCUMENTS

| 6,044,367 | A  | 3/2000  | Wolff             |
|-----------|----|---------|-------------------|
| 6,185,601 | B1 | 2/2001  | Wolff             |
| 6,732,104 | B1 | 5/2004  | Weber             |
| 6,886,035 | B2 | 4/2005  | Wolff             |
| 7,673,110 | B2 | 3/2010  | Yamamoto et al.   |
| 2002/0184463 | A1 | 12/2002 | Arakawa et al. |
| 2003/0033494 | A1 | 2/2003  | Fujibayashi et al. |
| 2003/0126200 | A1 | 7/2003  | Wolff          |
| 2003/0204597 | A1 | 10/2003 | Arakawa et al. |
| 2004/0043755 | A1 | 3/2004  | Shimooka et al. |
| 2004/0078632 | A1 | 4/2004  | Infante et al. |
| 2004/0133707 | A1 | 7/2004  | Yoshiya et al. |
| 2004/0143832 | A1 | 7/2004  | Yamamoto et al. |

(Continued)

FOREIGN PATENT DOCUMENTS

| JP | 2004-086512 | 3/2004 |
| JP | 2004-206623 | 7/2004 |

(Continued)

OTHER PUBLICATIONS

Notification of Reasons for Refusal for Japanese Patent Application No. 2006-289971, mailed Jan. 6, 2009 (with English translation).

*Primary Examiner* — Kaushikkumar Patel
(74) *Attorney, Agent, or Firm* — Brundidge & Stanger, P.C.

(57) ABSTRACT

In a system where a first storage system and a second storage system are connected to a third storage system, when the first storage system virtualizes and provides a device in the third storage system as a device in its own storage system, update data stored in a cache in the first storage system is written into the device of the third storage system to be reflected, attributes of the device are transferred to the second storage system, and the second storage system virtualizes the device of the third storage system as a device of its own storage system.

14 Claims, 14 Drawing Sheets

(56) References Cited

U.S. PATENT DOCUMENTS

| | | |
|---|---|---|
| 2004/0193827 A1 | 9/2004 | Mogi et al. |
| 2004/0225662 A1 | 11/2004 | Nojima |
| 2004/0257857 A1 | 12/2004 | Yamamoto et al. |
| 2005/0193167 A1 | 9/2005 | Eguchi et al. |
| 2005/0216692 A1 | 9/2005 | Watanabe et al. |
| 2005/0259632 A1 | 11/2005 | Malpani et al. |
| 2006/0220533 A1 | 10/2006 | Achiwa et al. |
| 2006/0253549 A1 | 11/2006 | Arakawa et al. |
| 2006/0271758 A1 | 11/2006 | Innan et al. |
| 2007/0055840 A1 | 3/2007 | Yamamoto et al. |
| 2007/0094357 A1 | 4/2007 | Sugitani et al. |
| 2010/0131731 A1 | 5/2010 | Yamamoto et al. |

FOREIGN PATENT DOCUMENTS

| | | |
|---|---|---|
| JP | 2004-220450 | 8/2004 |
| JP | 2004-302751 | 10/2004 |
| JP | 2004-334561 | 11/2004 |
| JP | 2005-011277 | 1/2005 |
| JP | 2005-242690 | 9/2005 |
| JP | 2005-275525 | 10/2005 |

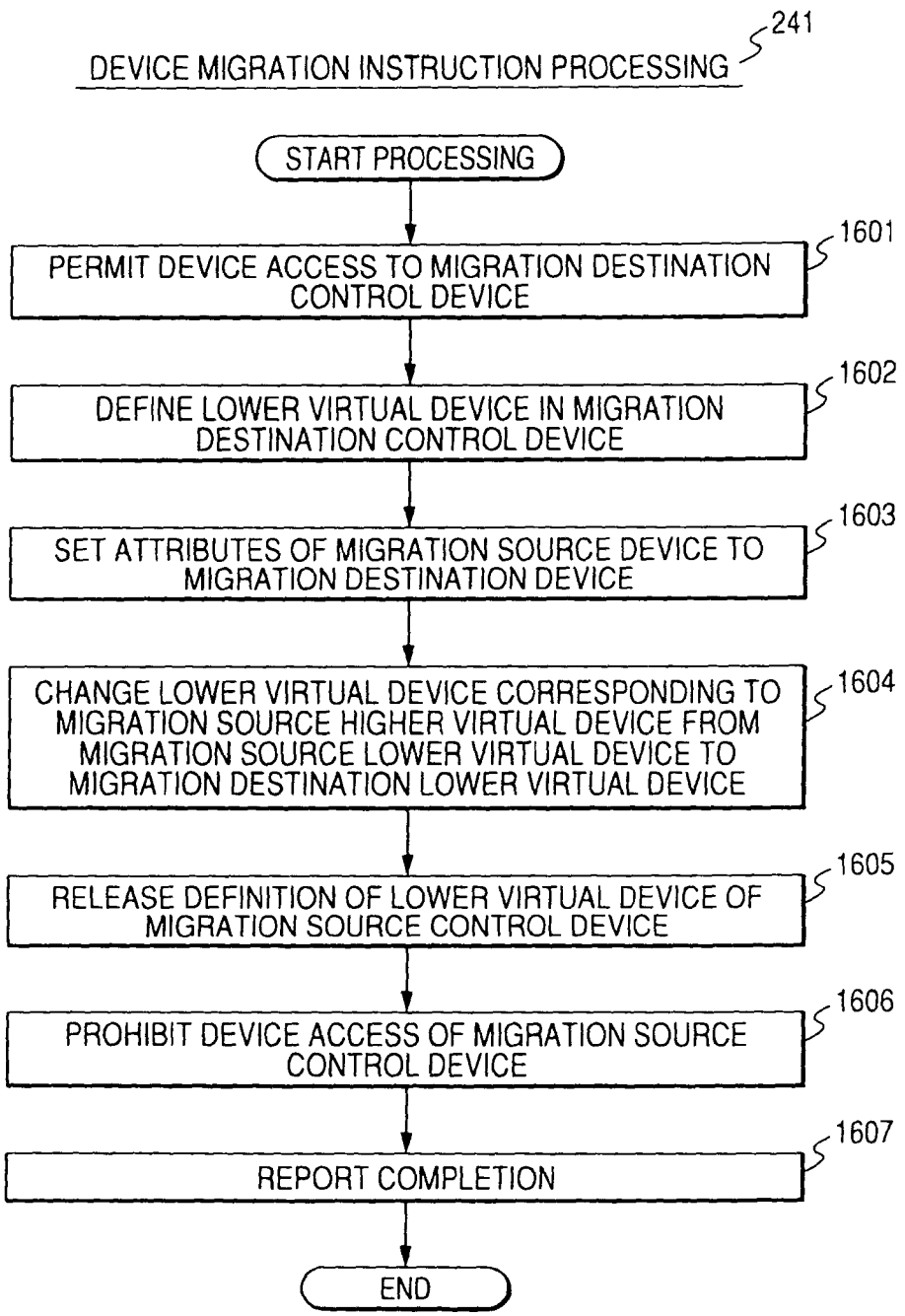

CONTROL METHOD OF DEVICE IN STORAGE SYSTEM FOR VIRTUALIZATION

CROSS REFERENCE TO RELATED APPLICATIONS

The present application is a continuation of application Ser. No. 12/691,197, filed Jan. 21, 2010; now U.S. Pat. No. 8,214,615 which is a continuation application of application Ser. No. 11/254,798, filed Oct. 21, 2005, now U.S. Pat. No. 7,673,110; which relates to and claims priority from Japanese Patent Application No. 2005-255826, filed on Sep. 5, 2005, the entire disclosures of which are incorporated herein by reference.

BACKGROUND OF THE INVENTION

1. Field of the Invention

The present invention relates to a storage device system (hereafter referred to as a "storage system") for storing data used by a computer in a computer system. More specifically, the present invention relates to a control method of a storage system by which a host computer (hereafter referred to as a "host") is connected to one or more other storage systems, and the storage areas in the other storage systems ("hereafter referred to as a "device") are virtualized as a device of its own.

2. Description of the Related Art

The amount of data received/transmitted by computers has remarkably increased as information systems are rapidly developing, for example, expansion of the internet business, computerization of procedures, and the like. In addition to such remarkable increase in the amount of data, the amount of data to be stored in storages such as disk-to-disk backup or long term storage of business activity records (transaction information, mail, or the like) of corporations in response to, for example, dealing with audits, is also increasing rapidly. Accordingly, in corporation information systems, while enhancing storages of every aspect/every system is pursued, management of IT infrastructure, which has become more complicated, is searching for an efficient and simplified system. In particular, there has been a rising expectation to the technology that seeks to optimize the total cost using the optimal storages according to the value of data.

One of the approaches to reduce the management cost of systems with large scale storage is the storage virtualization technology disclosed in JP-A-2005-011277. The above document discloses a storage virtualization technology (hereafter referred to as an "external storage connecting technology") wherein a first storage system is connected to one or more second storage systems, and devices to be provided by the second storage systems to upper level devices such as hosts are provided to the hosts as a logical device of the first storage system (hereafter referred to as a "logical device") through the first storage system. The first storage system, when receiving an input/output request of the logical device from the host, determines the target access device corresponds to which device between the logical device of the second storage system and a physical device such as a disk device contained in the first storage system (hereafter referred to as a "physical device"), and, pursuant to the outcome of the determination, distributes the input/output request of an appropriate access destination.

The storage system utilizing the external storage connection technology disclosed in JP-A-2005-011277 enables a system in which a plurality of storage systems each of which having differing attributes such as performance, reliability, cost, and the like are collected. For example, an optimal data allocation pursuant to the up-to-date and value of the data is enabled by connecting the first storage system having high cost, high functionality, and high reliability which utilizes the external storage connection technology to the second storage system having low cost, low functionality, and low reliability, and structuring the tiered storage areas. By using systems with storages having different storage layers, for the purpose of preparing for audits, or the like, a large amount of information such as transaction information, mail, or the like, that is generated during everyday business can be stored in a long term storage at optimal cost in response to the value of each information.

However, as described above, when a large amount of data is stored for a long time, i.e., several decades during the life span of the storage, the devices constituting the computer system are needed to be replaced in the middle of the data storage period. In particular, JP-A-2005-011277 discloses a migration method by copying the data of the device managed by the first storage system of the migration source to the first storage system that will be the migration destination of the newly introduced data. However, when the conventional input/output processing of the device performed by the first storage system, the data copy processing may be adversely affected, for example, a decrease in output. Furthermore, the large amount of device data that will be migrated needs to be copied in its entirety, consequently, a large amount of time is necessary for the device transfers between the first storages.

Furthermore, it is expected that, in a system having a storage dealing with a large amount of data such as in large scale data centers, from the perspective of securing performance, a plurality of the first storage systems may be connected and managed in the system. In such a system, since each of the first storage systems virtualizes the large amount of data belonging to the second storage system, workload imbalance between the first storage systems may be increased depending on the fluctuation in the input/output workload to each of the devices (hereafter, input/output to the device is also referred to as "I/O").

SUMMARY OF THE INVENTION

The object of the present invention is, in a computer system using the storage virtualization technology, to equalize the balance between the storage processing capacity and the input/output workload according to, for example, system configuration changes such as addition or removal of devices, decrease in the input/output processing capacity of a particular storage system caused by device faults, fluctuation in the input/output workload of a host, or the like.

In order to achieve the equalization/optimization of the input/output workload between the storage systems, the present invention provides the following means for device transfer between the storage systems controlling the virtualization of the devices (hereafter referred to as a "virtualization control storage system").

In a computer system including a host, a management server, a first and a second virtualization control storage system using the external storage technology (hereafter referred to as a "first and second storage systems"), one or more third storage systems virtualized by an external storage connection, a third device in the third storage system is virtualized as a first device in the first storage. A device such as the third device, which is a device in another storage system when viewed from the first storage system and is correlated to the device in the first storage system, is referred to as a "virtual device". In this instance, the third device as a virtual device is migrated from the first device in the first storage system to the second device in the second storage system.

In one embodiment, a second device defines that virtualizes a third device in the second storage system, and a definition of a virtual device in the virtualized control storage system (hereafter referred to as a "virtual device definition") is migrated from the first storage system to the second storage system by switching an access target device from the first device to the second device through transferring the attributes of the first device and the like, cooperating with the host, and the like.

Furthermore, in another embodiment, a second device defines that virtualizes a first device in the second storage system, and, after switching the access target from the host from the first device to the second device, migration of the definition of the virtual device is performed by changing the virtualization target of the second device from the first device to the third device.

Furthermore, to adjust the balance between the storage processing capacity and the input/output workload, the management server periodically collects configuration information and operation information of the first and the second storage systems, and monitors the first and the second storage systems. A system equalizing the I/O workload between the storage systems is implemented by detecting a decrease in the I/O processing capacity caused by configuration section faults such as a control processor or a cache memory, configuration changes of the system such as new addition of a storage system or removal of a storage system due to device deterioration, or imbalance of the host workload caused by the I/O workload from the host.

BRIEF DESCRIPTION OF THE DRAWINGS

FIG. 16 is a drawing showing an example of processing flow of the device migration instruction processing 241 performed in the management server 110 according to the variation of the invention.

DESCRIPTION OF THE PREFERRED EMBODIMENTS

Figure 1:
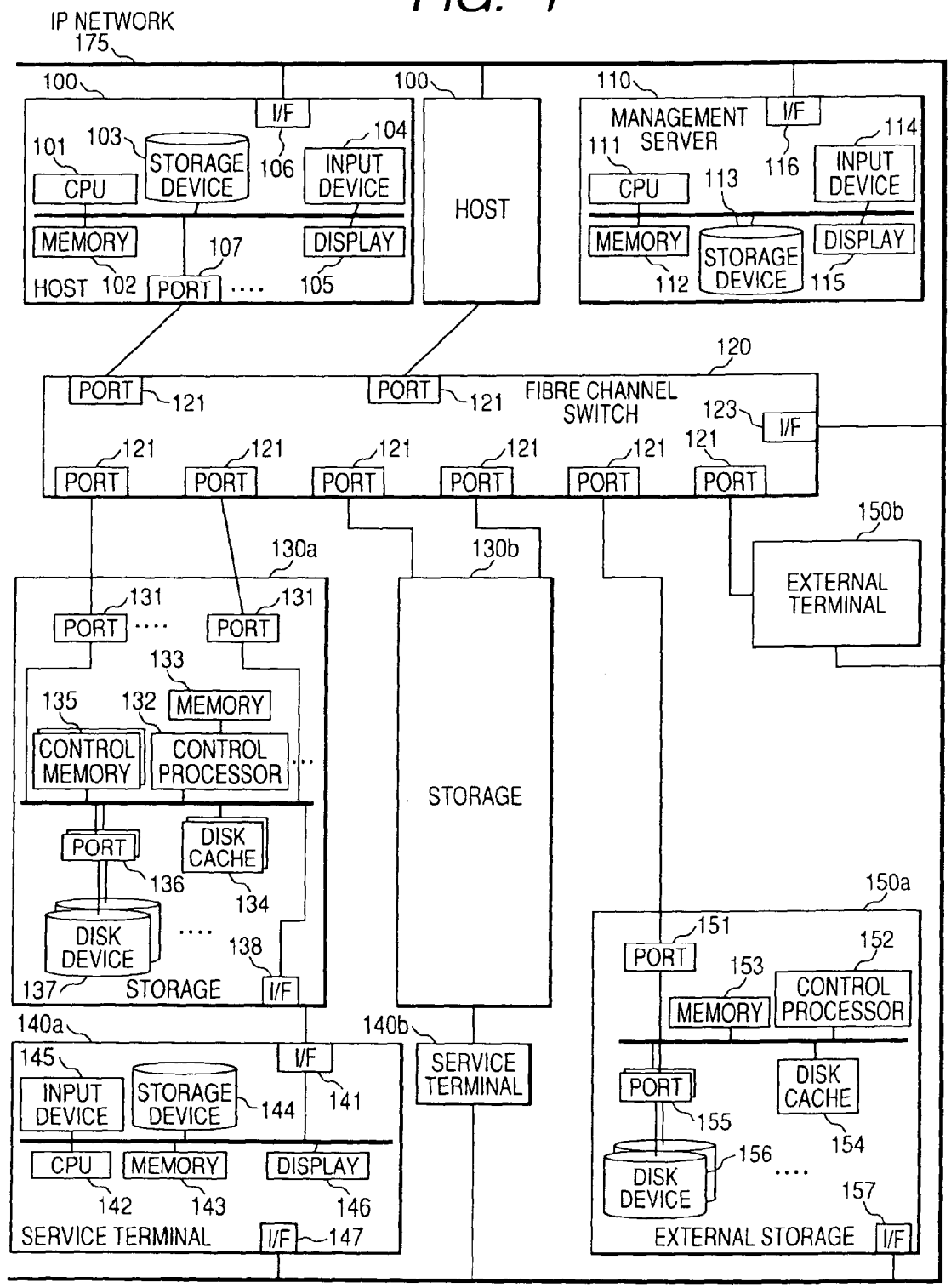
FIG. 1 is a drawing that shows an example of a hardware configuration of a computer system.

A first embodiment and a second embodiment are described below as examples among various embodiments of the present invention.

The first and second embodiments show an example wherein a first and a second storage systems using the external storage connection technology are implemented in a system by a plurality of storage systems virtualizing a device in a third storage system as a virtual device (hereafter, referred to as a "virtual storage system").

The first embodiments defines, when virtualizing a third device of the third storage system as a first device of the first storage system, a second device virtualizing a third device in the second storage system, and transfers the attributes or the like of the first device from the first storage system to the second storage system. Thereafter, in cooperation with the host, a virtual device is defined by switching the access target device from the host from the first device to the second device.

Specifically, first, the management server, in response to an instruction from a user or a storage administrator, defines the second device virtualizing the third device to the second storage system which is to be a migration destination, transfers each of the attributes set in the first device into the second device, and defines a LU path of the second device. Here, the definition of the LU path means correlating the logical device to the LUN (Logical Unit Number) of each of the ports so that the upper level device and the like can access from a port of the storage system to the logical device. Next, the management server, after instructing the host to recognize the second device, sets the input/output processing operation mode to the first device of the first storage device, to a mode in which a write into the disk device is performed synchronously with the host request (hereafter referred to as a "cache-through mode").

Furthermore, the management server defines, to the host, a path to the second device as an alternative path to the first device. Here, the alternative path indicates, for a logical device having a plurality of paths from the host, another path that is used when a different path from the path used for access is switched among the plurality of paths. Thereafter, an I/O stop to the first device is instructed to the first storage system. As a result, the host distributes subsequent I/Os from the first device to the second device through the path set as the alternative path. Thereafter, the management server requests the host to release the definition of the alternative path of the first device, and release definition of the first device in the first storage system.

The second embodiment, in the above-described virtual storage system, when virtualizing the third device of the third storage system as the first device of the first storage system, defines the second device in the second storage system virtualizing the first device, changes the virtualization target of the second device from the first device to the third device after switching the access target from the host from the first device to the second device, and performs a definition of the virtual device.

Specifically, first, the management server, in response to an instruction from a user or a storage administrator, defines the second device virtualizing the first device to the second storage system which is to be the migration destination, transfers each of the attributes set in the first device into the second device, and defines the LU path of the second device. Next, after the host is instructed to recognize the second device, for the second storage system, the input/output processing operation mode of the second device is set to the cache-through mode.

Furthermore, the host defines an access path to the second device as an alternative path of the first device, and thereafter, the first storage system is instructed to stop I/Os to the first device from the host. As a result, the host distributes the subsequent I/Os to the first device to the second device through the path set as the alternative path. Thereafter, the definition of the alternative path of the first device of the host is released, and the definition of the first device of the first storage is released. Furthermore, the second storage system is instructed to release the cache-through mode of the second device, and the first storage system is instructed to set the cache-through mode of the first device. Thereafter, the correlation of the devices is changed so that the second device of the second storage system virtualizes the third device of the third storage system.

In the first embodiment, since in both the first and the second storage systems virtualizing the third device, cache-through mode operation is performed, and the write processing to the third device of the third storage system is performed synchronously between them, resulting in a decrease in performance occurs. However, in the second embodiment, since the virtual device of the first storage system is virtualized in the second storage system (in other words, double-virtualization), in the migration processing, non-synchronous write processing using a disk cache on at least one of the first or the second storage systems may be performed, and thus a decrease in performance is reduced.

Furthermore, in the first and the second embodiments, the management server 110 monitors operation information and configuration information of the first and the second storage systems, and detects whether the workload is concentrated on a specific virtual device or the first and the second storage systems, thereby realizing equalization of the input/output workload between the first and the second storage systems.

First Embodiment

The first embodiment is described below with reference to FIGS. 1 through 10.

FIG. 1 shows an example of a hardware configuration of a computer system in accordance with the first embodiment of the present invention.

The computer system includes at least one host 100, a management server 110, a fibre channel switch 120, storage systems 130a and 130b (generally referred to as a "storage system 130"), service terminals 140a and 140b (generally referred to as a "service terminal 140"), and external storages 150a and 150b (generally referred to as an "external storage 150"). The host 100, the storage system 130 and the external storage 150 are connected to ports 121 of the fibre channel switch 120 through ports 107, 131 and 151, respectively. Also, the host 100, the storage system 130, the external storage 150 and the fibre channel switch 120 are connected to the management server 110 from interface control sections 106, 138, 157 and 123, respectively, through an IP network 175, and managed by storage management software (not shown) that operates on the management server 110. It is noted that, although the storage system 130 in accordance with the present embodiment is connected to the management server 110 through the service terminal 140, the storage system 130 may also be configured such that it is directly connected to the IP network.

The host 100 is a computer that includes a CPU 101, a memory 102 and other components. Software including an operating system and application program stored in a storage device 103 such as a disk device, an optical magnetic disk device or the like is read onto the memory 102, and the CPU 101 reads the stored software from the memory 102 and executes them so that the host 100 can perform predetermined processings. The host 100 is equipped with an input device 104 such as a keyboard, a mouse, or the like, and an output device such as a display 105. The input device 104 receives inputs provided by, for example, a host management administrator, and the output device outputs information instructed by the CPU 101. Also, the host 100 includes one or more interface control sections 106 for connecting to the IP network 175.

The management server 110 is, like the host 100, a computer that has a CPU 111 and a memory 112. Storage management software stored in a storage device 113 such as a disk device, an optical magnetic disk device or the like is read onto the memory 112, and the CPU 111 reads the stored software from the memory 112 and executes them so that the management server 110 can achieve predetermined functions such as an operation/maintenance management of the overall computer system. When the storage management software is executed by the CPU 111, the management server 110 collects configuration information, resource usage rate, performance monitoring information, fault log or the like from each of the devices in the computer system at the interface control section 116 through the IP network 175. Then, the management server 110 outputs the collected information to the output device such as the display 115 so as to be displaced to the storage administrator. Also, the management server 110 receives instructions from the storage administrator through an input device 114 such as a keyboard, a mouse or the like, and transmits the received operation/maintenance instructions to each of the devices through the interface control section 116.

The storage system 130 has one or a plurality of ports 131, one or a plurality of control processors 132, one or a plurality of memories 133 each of which is connected to the control processor 132, respectively, one or a plurality of disk caches 134, one or a plurality of control memories 135, one or a plurality of ports 136, one or more disk devices 137 each of which is connected to the port 136, respectively, and an interface control section 138.

The control processor 132 specifies an access target device for an input/output request received at the ports 131, and processes the input/output request of the device in the disk device 137 or the external storage 150 corresponding to that device. In this instance, the control processor 132 specifies the access target device based on a port ID and an LUN ("Logical Unit Number") contained in the received input/output request. It is noted that, in the present embodiment, the ports 131 are assumed to be the ones compatible with a fiber channel interface with SCSI ("Small Computer System Interface") being as an upper protocol. However, ports may be also used that are compatible with another network interface, such as an IP network interface with SCSI being as an upper protocol.

The storage system 130 in accordance with the present embodiment has a device hierarchy as follows: first, a disk array composed of a plurality of disk devices 137 is formed, and the disk array is managed by the control processor 132 as a physical device. Furthermore, the control processor 132 assigns a logical device to a physical device mounted in the storage system 130 (in other words, the control processor 132 correlates a physical device to a logical device). The logical devices are managed in the storage system 130, and their numbers are independently managed in each storage system 130.

A logical device is correlated to a LUN that is assigned to each of the ports 131, and is provided to the host 100 as a device of the storage system 130. In other words, what the host 100 recognizes is a logical device of the storage system 130, and the host 100 accesses data stored in the storage system 130 by using the LUN of the port 131 corresponding to the logical device. It is noted that, in the present embodiment, the control processor 132 manages a logical device of the external storage 150 as an external device, and virtualizes it as a device of the storage system 130 (hereafter, a logical device existing in a separate storage system from one storage system will be referred to as an "external device" for the storage system). In other words, an external device managed by the storage system 130 is a virtual device. One or more external devices brought using the external storage connection technology are correlated to the logical devices of the storage system 130, like physical devices. It is noted that the external devices are also independently managed in each storage system 130.

To implement the above-described device hierarchy, the control processor 132 manages logical devices, physical devices, disk devices 137, external devices, logical devices of the external storages 150, and their respective correlations between devices. Furthermore, the control processor 132 converts an access request of a logical device to an access request of the disk devices 137, an access request of a logical device in the external storage 150, and performs a transmission to appropriate devices.

It is noted that, as described above, the storage system 130 in accordance with the present embodiment defines a single physical device or a plurality of physical devices by combining a plurality of disk devices 137 (in other words, a plurality of disk devices 137 are combined and correlated to one or a plurality of physical devices), and assigns one logical device to one physical device, and provides them to the host 100. However, each of the disk devices 137 may be made to appear to the host 100 as a single physical device and a single logical device.

Also, in addition to the input/output processing to devices, the control processor 132 performs various data processings among devices, such as data copy, data relocation, or the like.

Also, the control processor 132 transmits configuration information to be presented to the storage administrator to the service terminal 140 that is connected through the interface control section 138, receives maintenance/operation instructions inputted to the service terminal 140 from the management administrator, and changes the configuration of the storage system 130.

The disk cache 134 may store data in advance that is frequently read from the disk devices 137, or temporarily store data received from the host 100, in order to increase the processing speed for access requests for data from the host 100. It is noted that, if a response to a write request is returned to the host 100 after storing write data received from the host 100 in the disk cache 134, but before the write data is actually written in the disk device 137, such processing is called a "write-after".

When a write-after is performed, the availability of the disk cache 134 may preferably be improved to prevent write data stored in the disk cache from being lost before it is written in the disk device 137, through, for example, using a non-volatile memory device as the disk cache 134 with a battery backup, duplicating data for improving the resistance to media problems, or the like.

The control memory 135 stores attributes of each device for implementing the above-described device hierarchy, control information for managing correlations among devices, and control information for managing clean data or dirty data stored in the disk cache 134.

If the control information stored in the control memory 135 is lost, data stored in the disk device 137 cannot be accessed. Accordingly, the control memory 135 may preferably be provided with a structure to improve its availability, through, for example, using a non-volatile memory device with a battery backup, duplicating data for improving the resistance to media fault, or the like.

As shown in FIG. 1, each part of the storage system 130 is connected with an internal network each other, and data, control information, and configuration information are transmitted/received among them. With the internal network, each of the control processors 132 can share and manage the configuration information of the storage system 130 from each other. It is noted that, in view of the improvement of availability, the internal network may also preferably be duplicated.

The service terminal 140 includes a CPU 142, a memory 143, a storage device 144, an interface control section 141 that is connected to the storage system 130, an interface control section 147 that is connected to the IP network 175, an input device 145 that receives inputs from the storage administrator, and an output device such as a display 146 that outputs configuration information and management information of the storage system 130 to the storage administrator. The CPU 142 reads out storage management programs stored in the storage device 144 to the memory 143, and executes the storage management programs to thereby refer to configuration information, instruct to change configuration, and instruct to perform specific functions, acting as an interface for maintenance and management of the storage system 130 between a storage administrator or the management server 110 and the storage system 130. It is noted that in the present embodiment, instead of using the service terminal 140, the storage system 130 may be directly connected to the management server 110, and the storage system 130 may be managed by using management software that operates on the management server 110.

The external storage 150 includes ports 151 that are connected to the ports 131 of the storage system 130 through the fibre channel switch 120, a control processor 152, a memory 153, a disk cache 154, one or a plurality of disk devices 156, and one or a plurality of ports 155 that are connected to disk devices, respectively. The control processor 152 processes input/output requests to the disk device 156 received at the ports 151 by executing programs stored in the memory 153. It is noted that in the present embodiment, although the external storage 150 does not have any control memory and structured as a storage system at a smaller size than the storage system 130, the external storage 150 may be structured as a plurality of storages of the same size having the same structure as the storage system 130.

It is noted that in the present embodiment, as shown in FIG. 1, since the ports 131 of the storage system 130 and the ports 151 of the external storage 150 are connected through the fibre channel switch 120, the zoning of the fibre channel switch 120 is preferably set so that direct access from the host 100 to the external storage 150 is restrained. Also, the ports 131 may be directly connected to the ports 151 without using the fibre channel switch 120.

Figure 2:
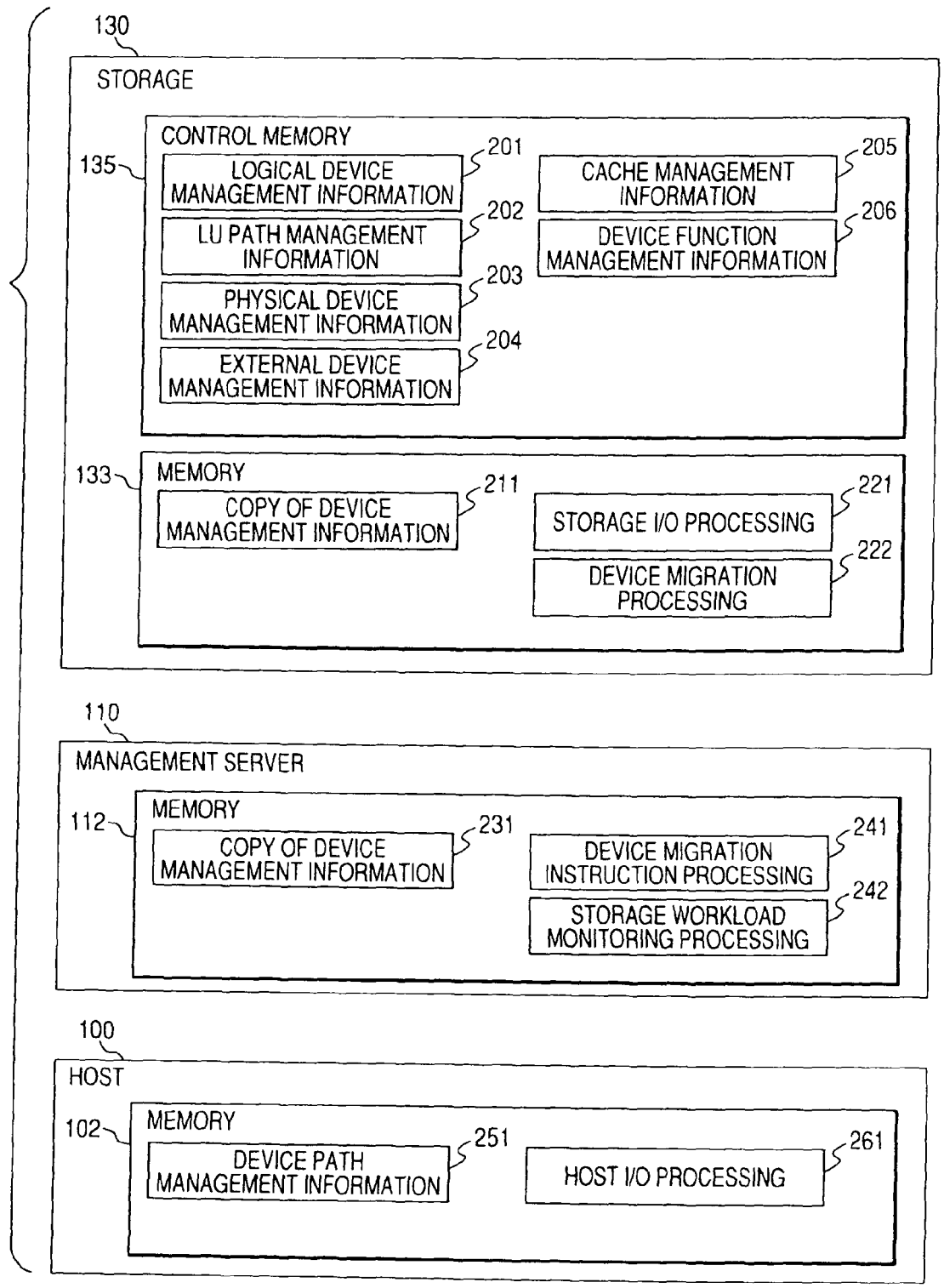
FIG. 2 is a drawing that shows an example of a software configuration of a computer system.

Next, a software configuration of the storage system 130 in accordance with an embodiment of the present invention is described below. FIG. 2 shows an example of a software configuration of control information and a program for storage control processings, which are stored in the control memory and the memory of the storage system 130, the management server 110, and the host 100.

Configuration management information of the storage system 130 in the control memory 135 includes memory device management information 201, LU path management information 202, physical device management information 203, external device management information 204, cache management information 205, and device function management information 206. In the present embodiment, to prevent information loss, such information is stored in the control memory 135, and can be referred and updated by the control processor 132, which requires access through an interconnecting network.

In the present embodiment, to improve the processing performance, a copy of control information necessary for processes performed by each of the control processors 132 is stored in the memories 133. Furthermore, the control terminal 140 and the management server 110 also have a copy of configuration management information of the storage system 130. When an instruction from the storage management software or the storage administrator is received at the management server 110 or the service terminal 140 and the configuration of the storage system 130 changes accordingly, or when the configuration of each part in the storage system 130 changes due to problems or automatic replacements, one of the control processors 132 updates the relevant configuration management information in the control memory 135. Then, the control processor 132 notifies other control processors 132, the service terminal 140, and the management server 110, through the interconnecting network, of the fact that the control information is updated by the configuration change. The control processor 132 then provides the latest information from the control memory 135 to the memories of the other parts.

Also, the management server 110 stores in the memory 112 a copy of device management information 231 received from the storage system 130 or the external storage 150, and storage management information (not shown) that shows attributes of each of the storage systems. To prevent data loss, such information may also be stored in the storage device 113 mounted in the management server 110.

The host 100 recognizes the logical devices provided by the storage system 130 or the external storage 150, and manages them as device files. Correlation management information between a device file and a logical device of each of the storage system is referred to as "device path management information" 251. When the storage system 130 provides, for example, an identical logical device at a plurality of ports 131, a plurality of device files are generated with for the same logical device. The host 100 uniformly manages a plurality of device files for the same logical device, and performs input/output workload distribution to the relevant logical device and replacement processing in the case of port problems.

Figure 3:
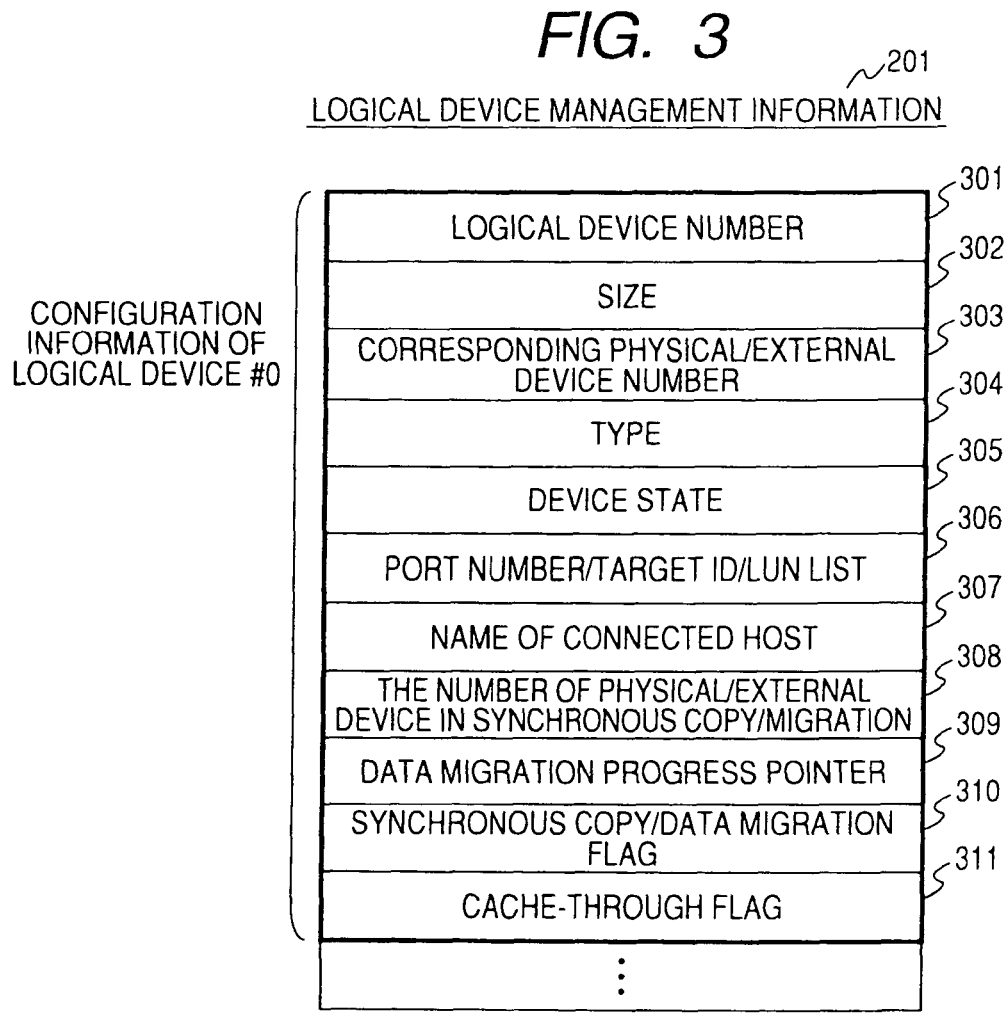
FIG. 3 is a drawing showing an example of logical device management information.

Next, each of the management information is described below. First, logical device management information 201 is described below. FIG. 3 shows an example of the logical device management information 201. The logical device management information 201 stores a set of information, for each logical device, containing an entry 301 through an entry 311.

The entry 301 stores a number that the control processor 132 assigned to a logical device to identify the logical device (hereafter referred to as a "logical device number").

The entry 302 stores size that shows the capacity of the logical device specified by the logical device number.

The entry 303 stores the number of a physical device or an external device that is correlated to the relevant logical device. In other words, an entry 501 or an entry 601 of the physical device management information 203 or external device management information 204, respectively, are stored, which are also management information, respectively. If a logical device is not defined, an invalid value is set in the entry 303.

It is noted that, in the present embodiment, since logical devices correspond to physical/external devices one-by-one, the entry 303 stores a single physical/external device number. However, when a plurality of physical/external devices are combined to form a single logical device, in the logical device management information 201, entries are necessary to store a number list of physical/external devices corresponding to each logical device, and the number of the physical/external devices. It is noted that, when a logical device is not defined, an invalid value is set in the entry 303.

The entry 304 stores device type identification information of the relevant logical device. The storage system 130 is capable of defining a plurality of device types of logical devices where the data management units on caches or the storage formats of them are different from each other (such as whether the management information is stored in the disk space, the storage structure, or the like). In this instance, the entry 304 stores which device type it is for each logical device.

The entry 305 is set for information indicating a state of the relevant logical device (hereafter, referred to as a "device state"). The device state may be "on-line", "off-line", "unmounted", or "blocked". The state "on-line" indicates a state in which the relevant logical device is in normal operation, LU paths are defined for one or more ports 131 by the management server 110, and can be accessed from the host 100. The state "off-line" indicates a state in which the relevant logical device is defined and in normal operation, but cannot be accessed from the host 100 due to a certain reason, such as, a LU path is not defined. The state "unmounted" indicates a state in which a relevant logical device is not defined for a physical device or an external device, and cannot be accessed from a host 100. The state "blocked" indicates a state in which a problem occurred in the relevant logical device, and cannot be accessed from a host 100. The initial value of the entry 305 is "unmounted", and changed to "off-line" by the logical device definition processing, and further changed to "on-line" by the LU path definition processing.

The entry 306 stores information to identify the relevant logical device, such as a port number, a target ID, a LUN list, and the like. Port number is information that indicates which one of the plurality of ports 131 is the LUN that is correlated to the relevant logical device. In other words, the port number is an identifier of the port 131 used to access the relevant logical device. Here, the identification information of the port 131 is a number assigned to each of the ports 131, which is uniquely identifiable in the storage system 130. Also, Target ID and LUN List stored in the entry 306 are identifiers to identify the relevant logical device. In the present embodiment, SCSI-ID used for accessing a device from a host 100 on SCSI and LUN are used as identifiers to identify a logical device. Each information in the entry 306 is set when definitions are performed for the relevant logical device.

The entry 307 stores a host name identifying the host 100 that is permitted to access the relevant logical device (hereafter referred to as a "name of connected host"). As a host name, any value can be used as long as it is capable of uniquely identifying each host 100 or each port 107, such as, for example, a WWN (World Wide Name) given to the port 107 of a host 100. In addition, the storage system 130 stores management information relating to attributes of each of the ports 131 such as WWNs. The relevant entry 307 is set when a logical device is defined by the storage administrator.

When a relevant logical device is in synchronous copy of in migration, which will be described later, the entry 308 is set to the physical device number or the external device number of the copy destination or the migration destination. When a relevant logical device is neither in synchronous copy nor in data migration, the entry 308 is set to an invalid value.

When a relevant logical device is in data migration, the entry 309 stores information indicating the final address where data migration is completed (hereafter referred to as a "data migration progress pointer"). The data migration progress pointer is used to determine whether the access target area is already migrated or to be migrated and select a process when an I/O request is received from a host 100 to the relevant logical device.

The entry 310 stores information indicating whether the relevant logical device is in synchronous copy, or in data migration, or in a state other than either of them (hereafter, referred to as a "synchronous copy/data migration flag").

The entry 311 stores information indicating whether a data update process to the relevant logical device is performed in the cache-through mode (hereafter referred to as a "cache-through flag"). Specifically, the cache-through mode indicates an operation by which, in the case of updating data from a host, the update data is stored in a cache, and then the update data is written into the disk device, and thereafter completion of the update process is reported to the host.

Figure 4:
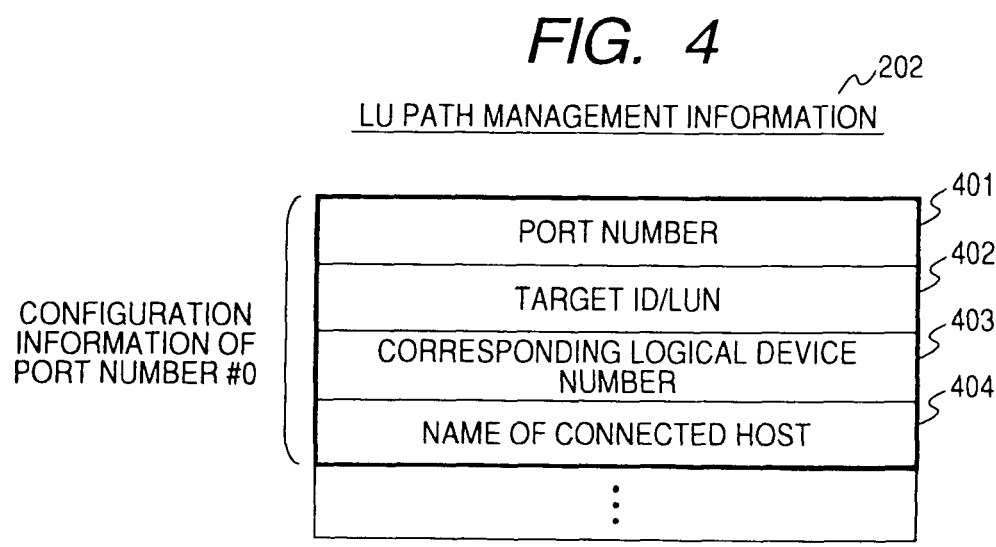
FIG. 4 is a drawing that shows an example of LU path management information.

Secondly, LU path management information 202 is described below. FIG. 4 shows an example of LU Path Management Information 202. LU Path Management Information 202 stores information of the effective LUNs defined in each port for each of the ports 131 in the storage system 130.

The entry 401 stores, as the port numbers described above, information identifying the relevant port 131.

The entry 402 stores the LUN defined (assigned) to the port 131. The entry 403 stores the number of the logical device to which the LUN is assigned (hereafter referred to as a "corresponding logical device number"). The entry 404 stores information indicating hosts 100 that are permitted to access the LUN which is defined to the relevant port 131. The information indicating the hosts 100 includes, for example, the WWN given to the port 107 of the host 100 as described above.

It is noted that LUNs of a plurality of ports 131 may be defined for one logical device, and the logical device may be accessed from the plurality of ports 131. In this instance, the entry 307 of the logical device management information 201 to the relevant logical device stores a sumset of names of accessing hosts of the LU path management information 202 for each of the LUNs of the plurality of ports 131.

Figure 5:
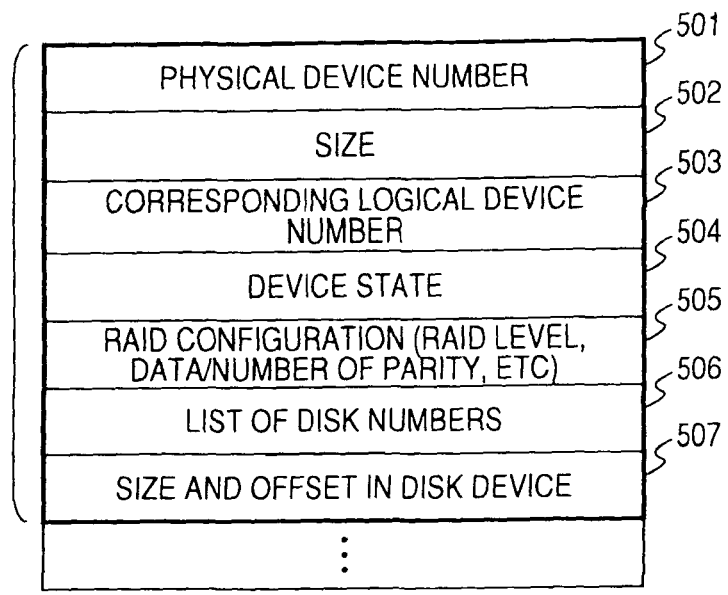
FIG. 5 is a drawing that shows an example of physical device management information.

Thirdly, physical device management information 203 is described. The physical device management information 203 is used to manage the physical device which is composed of one or more disk devices 137 in the storage system 130. FIG. 5 shows an example of the physical device management information 203. Each of the storage systems 130 stores a set of information from an entry 501 through an entry 507 for each of the physical devices existing in its own.

In an entry 501 is registered an identification number for identifying a physical device (hereafter referred to as a "physical device number"). The entry 502 stores the size of the physical device specified by the entry 501. The entry 503 stores a logical device number to which the relevant physical device is correlated, as a corresponding logical device number. Storing in an entry 503 is performed when the relevant logical device to which the relevant physical device is correlated is defined. When the relevant physical device is not assigned to a logical device, an invalid value is set in the entry 503.

The entry 504 is set to information indicating the state of the relevant physical device ("device state"). The state may be "on-line", "off-line", "unmounted", or "blocked". The state "on-line" indicates a state in which the relevant physical device is in normal operation, and assigned to a logical device. The state "off-line" indicates a state in which the relevant physical device is defined and in normal operation, but not assigned to any logical device. The state "unmounted" indicates a state in which the relevant physical device is not defined on the disk device 137. The state "blocked" indicates a state in which a problem occurred in the relevant physical device and cannot be accessed. The initial value of the entry 504 is "unmounted", and changed to "off-line" by the physical device definition process, and further changed to "on-line" at a moment when a logical device is defined.

The entry 505 stores information regarding a RAID configuration such as the RAID level of the disk device 137 to which the relevant physical device is assigned, the number of the data disks and the parity disks, size of a stripe which is data dividing unit, and the like. The entry 506 stores as a list, each of identification numbers of a plurality of the disk devices 137 which include the RAIDs to which the relevant physical device is assigned. These identification numbers of the disk devices 137 are unique values given to identify the disk devices 137 in the storage system 130. The entry 507 stores information indicating in what area the relevant physical device is assigned in each of the disk devices 137 (hereafter referred to as a "size/offset in disk"). In the present embodiment, for the sake of simplification, offset and size in each of disk devices 137 including the RAID are assumed to be the same for the entire physical device.

Figure 6:
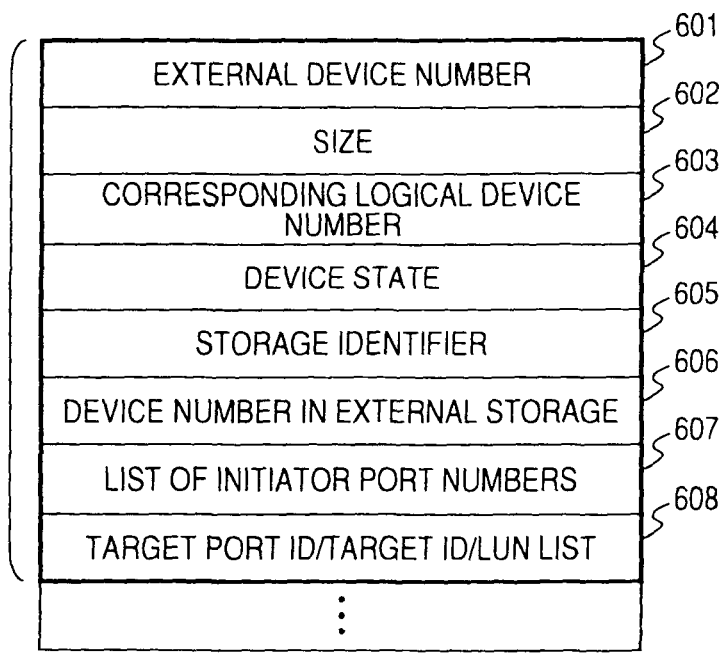
FIG. 6 is a drawing showing an example of external device management information.

Fourthly, external device management information 204 is described. The external device management information 204 is used to manage the logical device of the external storage 150 connected to the storage system 130 as an external device. FIG. 6 shows an example of the external device management information 204. The storage system 130 stores a set of information from an entry 601 to an entry 608 for each of the logical device (external device) existing in the external storage 150.

The entry 601 stores a unique value in the storage system 130, which the control processor 132 in the storage system 130 has assigned for the relevant external device (hereafter referred to as an "external device number"). The entry 602 stores the size of the external device specified by the external device number. The entry 603 is registered the logical device number in the storage system 130 to which the relevant external device is correlated, as a corresponding logical device number.

As in the entry 504 of physical device management information 203, the entry 604 is set to a device state of the relevant external device. It is noted that in the initial state, since the storage system 130 is not connected to the external storage 150, the initial value of the entry 604 is "unmounted".

The entry 605 stores an identifier of the external storage 150 to which the relevant external device is mounted (hereafter referred to as "storage identification information"). The storage identification information may include, for example, a combination of vendor identification information of the relevant storage system and a manufacturing serial number that each vendor has uniquely assigned, or the like. The entry 606 stores, as a device number in the external storage, an identification number that is assigned in the external storage 150, in other words, the logical device number, for the logical device in the external storage 150 corresponding to the relevant external device.

In the entry 607, an identification number of the port 131 of the storage system 130 which is capable of accessing the relevant external device (hereafter referred to as a "list of initiator port numbers") is registered. When a plurality of ports 131 is capable of accessing the relevant external device, a plurality of port identification numbers are registered.

The entry 608 stores, when the relevant external device is LUN defined to one or more ports 151 of the external storage 150, port IDs of those ports 151 and one or a plurality of target IDs/LUNs to which the external device is assigned. It is noted that, when the control processor 132 in the storage system 130 accesses the external device through the ports 131, as the information for identifying the external device, the target IDs and LUNs that are assigned to the relevant external device by the external storage 150 to which the external device belongs.

Finally, device function management information 206 will be described. The information stores information indicating various attributes set for each of the logical devices. Examples of attribute information of a device include access control information limiting access to the relevant logical device only to specified hosts, access attribute information restricting read or write access to the relevant logical device, encryption setting information such as whether an encryption method is used for the data in the logical device, key information used for encryption/decryption, or the like.

In the present embodiment, the storage system 130 manages devices using the above-mentioned each device management information. As for the initial states of the relevant storage system 130, it is assumed that, at the time of product shipment of the apparatus from factory, physical devices are defined in advance to each of the disk devices 137. A user or a storage administrator defines logical devices of the external storage 150 connected to the storage system 130 as external devices, at the time of introducing the storage system 130. Also, logical devices for those physical devices or external devices are defined, and LUNs are defined for each of the ports 131 for the relevant logical devices.

Next, referring back to FIG. 2, programs stored in the memories 133, 112, 102 of the storage systems 130, the management server 110 and the hosts 100 are described below. In the present embodiment, switching processing of control responsibility for the external devices between the storage systems 130, and a host I/O processing for the logical devices during such switching processing are performed in response to instructions from a user or a storage administrator. These processings are performed in cooperation of the management server 110, the storage systems 130, and the host 100.

First, in response to the switching processing of control responsibility for the external devices, the device migration instruction processing 241 is stored in the memory 112 in the management server 110, and the device migration processing 222 is stored in the memory 133 in the storage system 130, respectively. Also, in response to the host I/O processing to the logical device during the switching processing, the host I/O processing 261 is stored in the memory 102 in the host 100, and the storage I/O processing 221 is stored in the memory 133 in the storage system 130, respectively.

Figure 7:
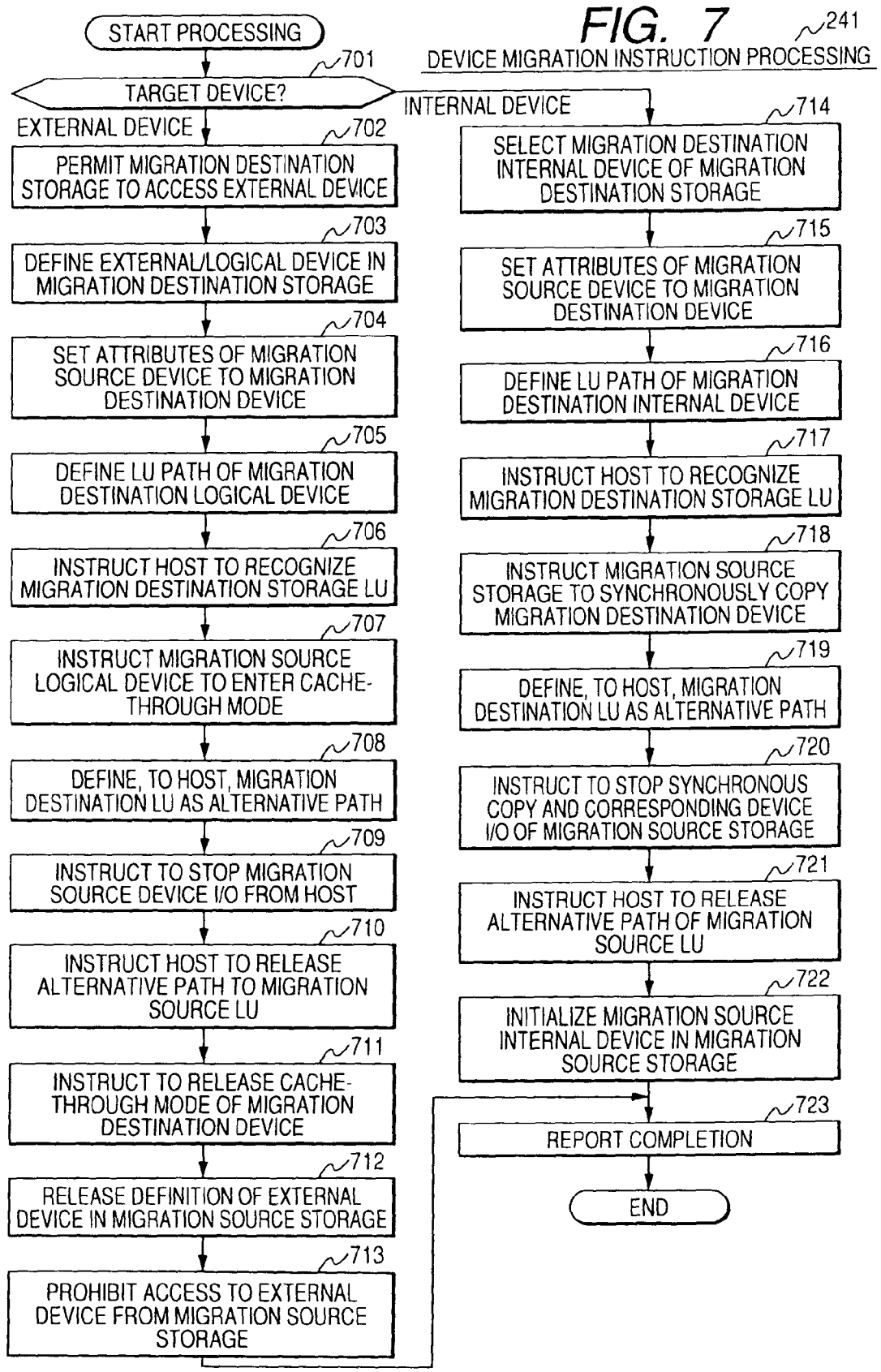
FIG. 7 is a drawing that shows an example of a processing flow of the device migration instruction processing 241 performed in the management server 110 according to the first embodiment.

FIG. 7 shows an example of a processing flow which is processed in the management server 110, the device migration instruction processing 241. The management server 110, through the IP network 175 and the interface control section 116, from a user, a management administrator or an application program, receives a request of migrate a first logical device of the storage system 130a (hereafter referred to as a "migration source storage system") to a second logical device of the storage system 130b (hereafter referred to as a "migration destination storage system"). The information contained in the request may be, for example, identification information of the storage systems 130a and 130b, the first and second logical device numbers, information necessary for LU path definition of the second logical device in the storage system 130b (port 131 specific information of the storage system 130b and a LUN list), and the like.

The management server 110 determines whether the device corresponding to the logical device of the migration target is an external device or an internal device (physical device) of the relevant storage system 130 (step 701).

If the relevant logical device corresponds to an external device, the management server 110 instructs the external storage 150 from the destination storage system 130b to change the access privilege of a third logical device of the external storage 150 corresponding to the external device so that the third logical device can be accessed (step 702).

The management server 110 defines an external device that virtualizes the third logical device in the migration destination storage system 130b, and defines the second logical device corresponding to the relevant external device (step 703). For the external device definition processing, specifically, with regard to the external device that virtualizes the third logical device in the storage system 130b, information regarding the external storage 150 and the third logical device is set in the entry of corresponding external device management information 204, from entry 602 to entry 608. In this instance, the management server 110 changes the device state at the entry 604 from "unmounted" to "off-line". Furthermore, the management server 110 sets the control information in each of the entries of the logical device management information 201 corresponding to the second logical device of the storage system 130b. For example, corresponding physical/external device number at the entry 303 is set to the device number of the relevant external device that virtualizes the third logical device.

Also, as described above, in the present step 703, entry 604 of the external device management information 204 is changed to "on-line", and entry 305 of the logical device management information 201 is changed from "unmounted" to "off-line". Furthermore, the cache-through flag at the entry 311 of the logical device management information 201 of the second logical device is set to ON, and the migration storage system 130b performs the write processing for the second logical device in the cache-through mode.

The management server 110 transfers various attributes set in the first logical device in the migration source storage system 130a into the second logical device in the migration destination storage system 130b (step 704). In this instance, examples of various attributes transferred from the first logical device to the second logical device include access control information limiting access to the logical device only to specific hosts 100, access attribute information restricting read or write access to the relevant logical device, and secondary information such as setting date/time and duration of the access attribute information, encryption setting information such as whether an encryption method is used for the data in the relevant logical device, key information used for encryption/decryption, and the like.

In the present step 704, the management server 110 obtains attributes of the first logical device from the migration source storage system 130a, and transfers them into the second logical device of the migration destination storage system 130b. For example, if the access attribute of the first logical device is set to permit access from a certain host 100 only, the management server 110 obtains the value of the name of the connected host at the entry 307 in the logical device management information 201 of the first logical device, and transfers it into the entry 307 in the logical device management information 201 of the second logical device. Also, for example, if the access attribute of the first logical device is set to prohibit write access for ten years from Jan. 1, 2010, the management server 110 transfers the access attribute of the second logical device so that write access is prohibited for ten years from the setting date of Jan. 1, 2010.

Also, in the present step 704, instead of performing the process of transferring attributes of the first logical device into the second logical device by the management server 110, the device attributes can be transferred between the migration source storage system 130a and the migration destination storage system 130b. For example, the migration destination storage system 130b may inquire the migration source storage system 130a about the attribution information of the first logical device, and transfers returned attribute information from the migration source storage system 130a into the second logical device in the migration destination storage system 130b. Also, conversely, the migration source storage system 130a may transmit the attributes of the first logical device to the migration destination storage system 130b, and instructs to set the attributes of the second logical device.

Then, the management server 110 defines a LU path of the second logical device in the migration destination storage system 130b (step 705). Specifically, a corresponding logical device number at the entry 403, and the like, are set into the entry of LU path management information 202 corresponding to the port 131 of the LU path definition target. Furthermore, in the present step 705, port 131 information that defines the LU path is set to the entry 201 of the logical device management information 201 corresponding to the second logical device, and the entry 305 is changed to "on-line".

The management server 110 instructs the host 100 to recognize the LU of the migration destination storage system 130b corresponding to the second logical device (step 706). Here, the host 100 that is instructed by the management server 110 to recognize the LU composes a device file for the LU that corresponds to the second logical device newly assigned to the storage system 130b by the management server 110. For example, in UNIX (registered mark) operating system from Hewlett-Packard Company, recognition of a new LU and composition of a device file is performed by "IOSCAN" command.

The host 100 detects whether the logical device of the storage system 130 corresponding to the newly composed device file is identical to one of the device files already composed, and if it is, manages such device files as a same group. Such identity determination can be performed by a method, for example, by which the logical device number in each storage system 130 corresponding to the LU is obtained by "Inquiry" command of SCSI, or the like. However, since the first logical device and the second logical device belong to the different storage systems 130a and 130b, respectively, they are not managed as a same group at that moment, and the host 100 recognizes the two device files as separate groups. In the present step 706, if one or more hosts 100 access the LU corresponding to the first logical device of the migration source storage system 130a, the management server 110 instructs the entire hosts 100 to recognize the LU of the migration destination storage system 130b in the same manner.

After recognition of the LU of the migration destination storage system 130b by the host 100 is complete, the management server 110 instructs the migration source storage system 130a to change the operation mode of the first logical device to the "cache-through mode" (step 707). Through this operation mode change, the storage system 130a writes the entire dirty update data stored in the disk cache 134 for the first logical device in the device migration processing 222 into the third logical device of the external storage 150. Through the present step 707, update data from the host 100 to the first logical device is written into the third logical device of the external storage 150 synchronously with an update request from the host. Accordingly, unwritten update data may be prevented from being congested in the disk cache 134 in the storage system 130a. Write processing of update data in the cache-through mode performed by the storage system 130 is described in the device migration processing 222 which is described below.

After being notified by the migration source storage system 130a of completion of the above-described write processing together with change to the cache-through mode, the management server 110 instructs the host 100 to define the LU path of the migration destination storage system 130b corresponding to the second logical device as an alternative path for the first logical device of the migration source storage system 130a (step 708). In this instance, if one or more hosts 100 access the first logical device of the migration source storage system 130a, all the hosts 100 are instructed to define the alternative path. Through the definition of the alternative path in the same manner, the host 100 recognizes the two device files composed in step 706 as the ones corresponding to the identical logical device. Being defined as a single group of an alternative path, the host 100 is capable of accessing the third logical device of the external storage 150 from both LU paths passing the storage systems 130a and 130b.

After defining alternative paths, the management server 110 instructs the migration source storage system 130a to reject to receive I/O requests from the host 100 to the first logical device (step 709), and instructs the host 100 to release the definition of the alternative path to the LU path of the migration source storage system 130a (step 710). In this instance, if one or more hosts 100 have accessed the first logical device, all of the hosts 100 are instructed in the same manner.

The management server 110 instructs the storage system 130b to release the cache-through mode of the second logical device, and permits write processings using the disk cache (step 711).

The management server 110 instructs to release definition of the external device virtualizing the third logical device of the external storage 150 from the migration source storage system 130a (step 712), and instructs the external storage 150 to change the access privilege of the third logical device so that the migration source storage system 130a is prohibited from accessing the third logical device (step 713).

On the other hand, it will be described where the detection process in step 701 the target logical device corresponds to a physical device in the storage system 130a.

First, the management server 110 selects, among the physical devices of the migration destination storage system 130b, one that will become the migration destination from the unused physical devices to which a logical device has not yet been defined, and defines a second logical device corresponding to the relevant physical device (step 714). In this instance, as parameter information for the device migration request, migration destination physical device-specific information may be received at the migration destination storage system 130b, and the instructed physical device may be used as the migration destination. Furthermore, in the present embodiment, although a physical device in the migration destination storage system 130b is selected as a migration destination device, the external device managed by the migration destination storage system 130b may also be selected as a migration destination device.

Next, the management server 110 transfers the attributes of the first logical device, which is the migration source, into the second logical device (step 715), and instructs to define a LU path of the second logical device in the migration destination storage system 130b (step 716).

After one or more hosts 100 recognize the LU (step 717), the migration source storage system 130a is instructed to synchronously copy the entire data in the first logical device to the second logical device of the migration destination storage system 130b (step 718). "Synchronous copy" means performing the copying processing synchronously with a write I/O request of the host. In synchronous copy, it is ensured that at the time of completion of the write processing from the host, copy processing is also certainly complete. After receiving the instruction, the migration source storage system 130a performs the copy processing for the entire data of the target logical device. Also, for host I/O requests that arrived during the copy processing, if the target area is an area where the synchronous copy is complete, double-write is performed both to the copy source and the copy destination, and if the target area is an area where the synchronous copy is yet to be complete, write is performed only to the copy source, i.e., the I/O processing is performed in response to the synchronous copy progress. The synchronous copy processing performed by the storage system 130 will be explained in the device migration processing 222 which is described below.

After receiving the completion report of the copy processing of the entire data from the migration source storage system 130a, the management server 110 instructs the host 100 to define a path for the LU of the migration source storage system 130b as an alternative path for the first logical device of the migration source storage system 130a (step 719).

Thereafter, the management server 110 instructs the migration source storage system 130a to stop I/O from the one or more hosts 100 to the first logical device, and stop the synchronous copy process (step 720), and instructs the one or more hosts 100 to release definition of the alternative path to the LU of the migration source storage system 130a and initialize the first logical device (steps 721 and 722). The I/O stop processing performed in the storage system 130 will be explained in the device migration processing 222, which will be described below. In the present step 722, initialization of the first logical device may be accomplished by deleting the stored data in the first logical device, or by releasing the correlation of the physical device corresponding to the first logical device, thereby putting the first logical device into "unmounted" state. Also, instead of deleting the stored data, only the attributes set in the first logical device may be released.

By the above-described processings, the management server 110 performs the migration processing of the logical device corresponding to the external device or internal physical device, and completes the process by reporting the process completion to the user or the application program (step 723).

Figure 8:
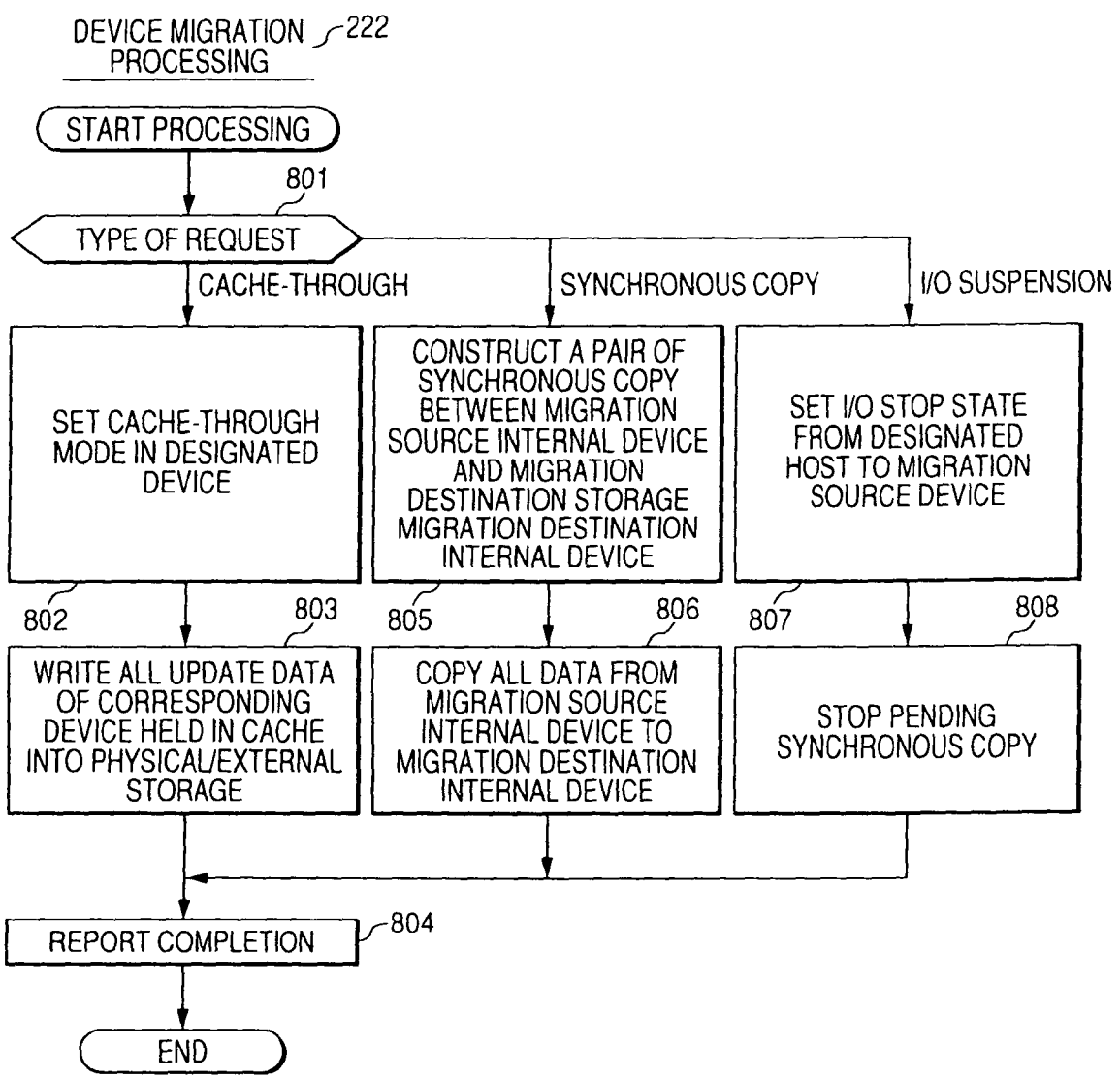
FIG. 8 is a drawing that shows an example of a processing flow of the device migration instruction processing 222 performed in the storage system 130 according to the first embodiment.

FIG. 8 shows an example of a process flow of the device migration processing 222 performed by the storage system 130. The storage system 130 selects the process according to the contents of the process request from the management server 110 (step 801).

If the process request is to set a specified logical device to the cache-mode, the storage system 130 sets ON at the entry 311 of the logical device management information 201 corresponding to the target logical device (step 802), and writes the entire dirty update data stored in the disk cache 134 for the relevant logical device into the physical device or the external device to which the relevant logical device corresponds (step 803).

If the process request from the management server 110 is an instruction to copy synchronously, the storage system 130 determines, from request parameter, one target first logical device, migration destination storage system 130b and the second logical device of the migration destination. Also, in step 805, control information is set for entries 308 through 310 of the logical device management information 201 corresponding to the first logical device, so that a synchronous copy pair is formed from the second logical device of the storage system 130b (step 805).

Then, using the entry 309 (data migration progress pointer) of the logical device management information 201 corresponding to the first logical device, the entire data of the first logical device is sequentially copied to the second logical device (step 806). It is noted that, although the entire data is completely copied, synchronous copy defined in the first and the second logical devices continues, so long as it is not released by the I/O stop requests or the like as described below. In this instance, update data from the host 100 to the relevant logical device received in synchronous copy is copied to the second logical device of the migration destination storage system 130b synchronously with the host request through the storage I/O processing 221 which is described below.

On the other hand, if the processing request from the management server 110 is an I/O stop request of a specific logical device, from the request parameter, a target logical device and one or more hosts 100 to stop the I/O are determined. And the identifiers of the one or more target hosts 100 for the I/O stop are deleted from the entry 307 of the logical device management information 201 corresponding to the relevant logical device. The I/O request of the logical device from the relevant hosts 100 is stopped accordingly (step 807).

Also, if the logical device is in synchronous copy, the synchronous copy is released, and for a normal operation, entries 308 through 310 of the corresponding logical device management information 201 are updated (step 808).

Figure 9:
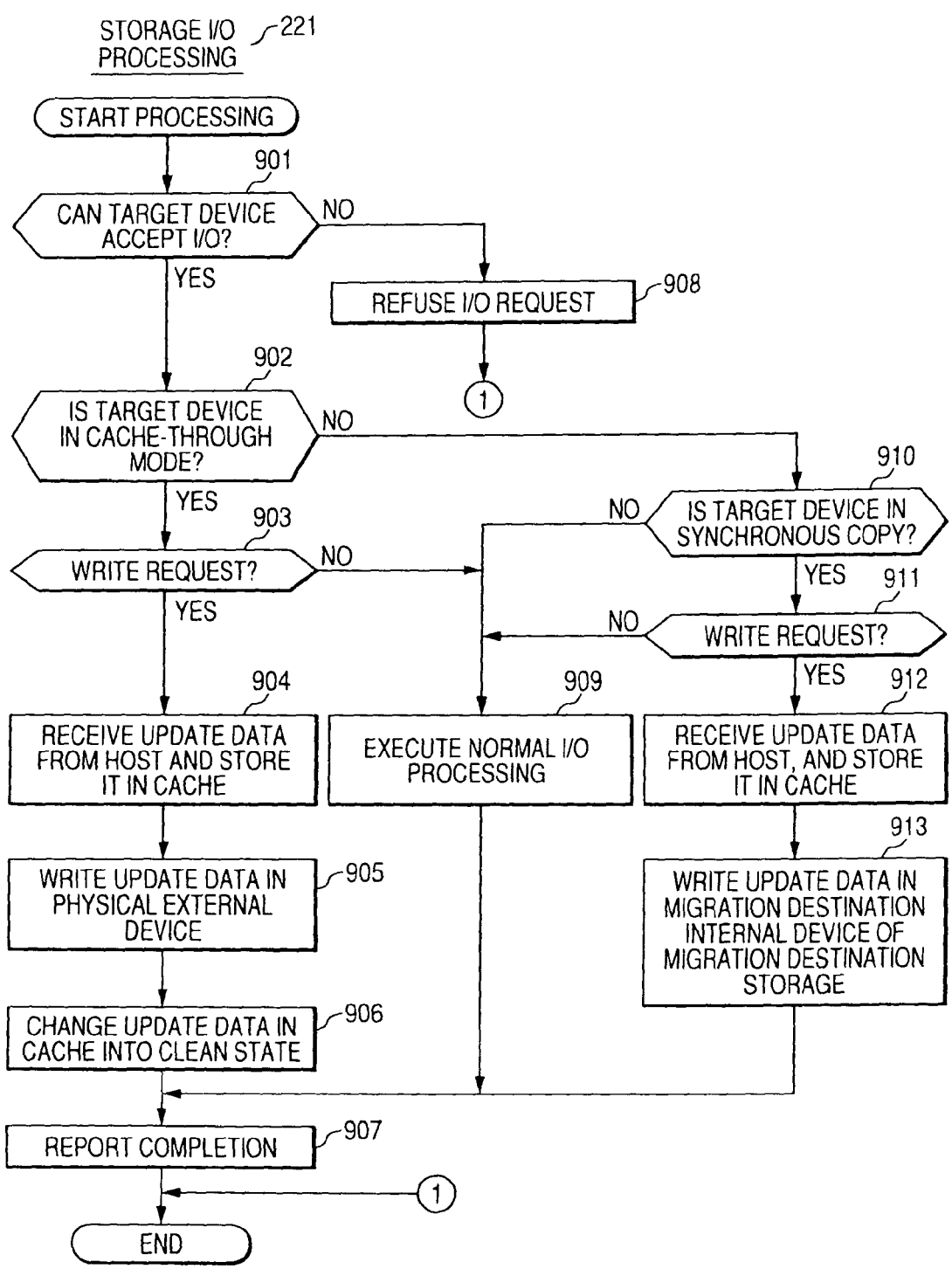
FIG. 9 is a drawing showing an example of a processing flow of the storage I/O processing 221 performed in the storage system 130 according to the first embodiment.

FIG. 9 shows an example illustrating the process flow of storage I/O processing 221, performed by the storage system 130. The storage system 130, receiving an I/O request from the host 100 through the port 131, checks the access privilege from the access source host 100 of the relevant request based on information such as the entry 307 of the logical device management information 201 (step 901), and if it is a request from a host 100 lacking the access privilege, rejects the request (step 908).

If the I/O request is receivable in step 901, the storage system 130 checks the cache-though mode at entry 311 of the logical device management information 201, and determines whether it is in the cache-through mode (step 902).

If it is in the cache-through mode, and the request is a write request (step 903), the storage system 130 stores the update data received from the host 100 into the disk cache 134 (step 904). Then, the storage system 130 writes the update data into the physical/external device corresponding to the relevant logical device (step 905), changes the update data stored in the disk cache 134 to the clean data state (step 906), and reports to the host 100 completion of the write request processing (step 907).

Also, if the target logical device is not in the cache-through mode (step 902), but in synchronous copy and the I/O request is a write request, the storage system 130 stores the update data received from the host 100 to the disk cache 134 (step 912). Thereafter, the storage system 130 writes the update data into the second logical device of the migration destination storage system 130b (step 913), and reports to the host 100 completion of the write request processing (step 907).

Also, if the target logical device is in the cache-through mode and the request is a request other than a write request, or the target logical device is not in the cache-through mode and not in synchronous copy, or in synchronous copy but the request is a request other than a write request, the storage system 130 performs the requested I/O request processing (step 909).

In step 909, in the case of the read request processing, the storage system 130 checks whether the target data is stored in the disk cache 134, and if it is not, reads it from the physical device or the external device and stores the data into the disk cache 134, and transmits it to the host 100. Also, for a write request, the storage system 130 reports to the host 100 completion of the write request at the time the update data received from the host 100 is stored in the disk cache 134, and writes it into the corresponding physical device or the external device at an appropriate timing thereafter.

Figure 10:
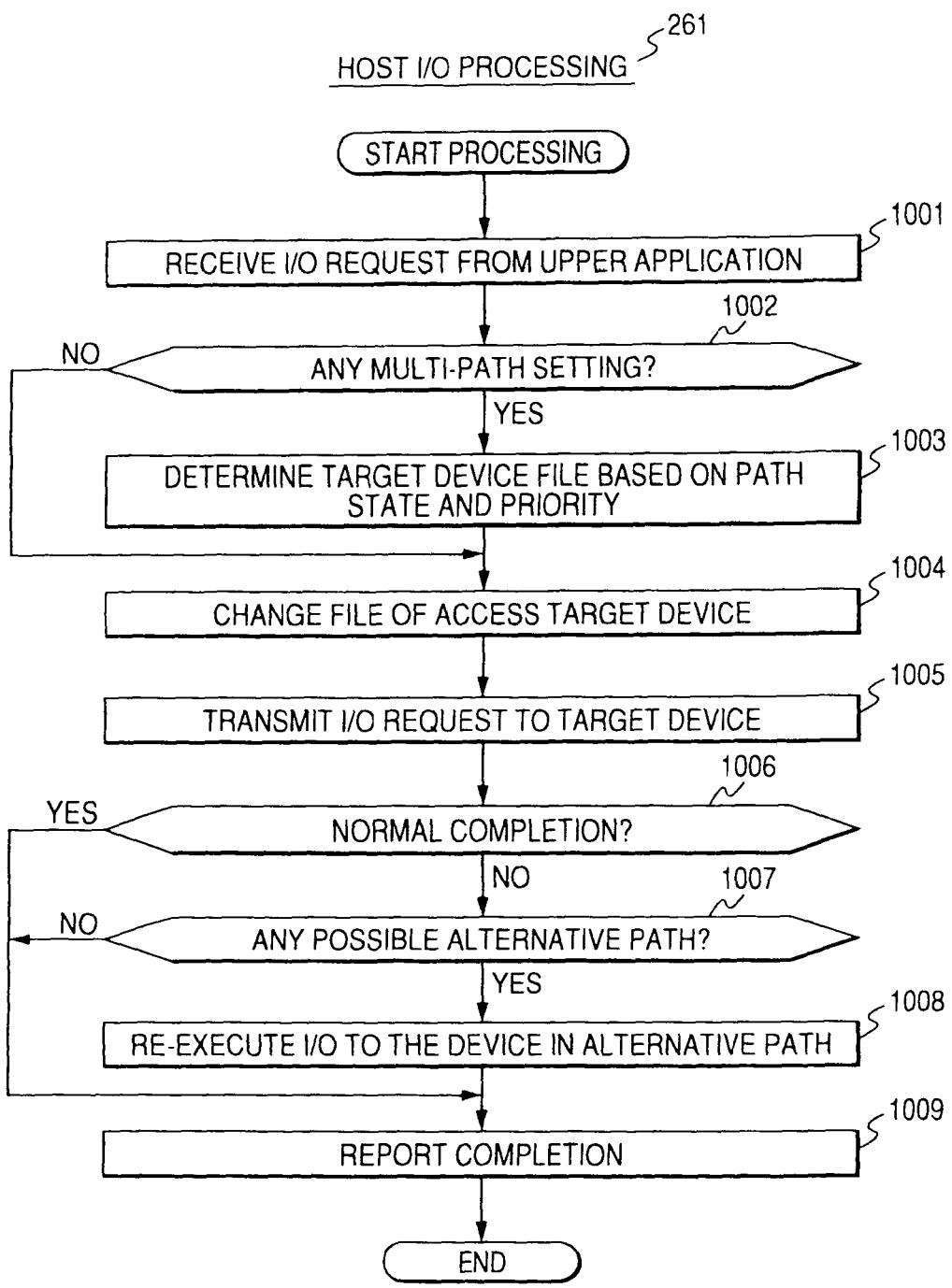
FIG. 10 is a drawing that shows an example of a processing flow of the host I/O processing 261 performed in the host 100 according to the first embodiment.

FIG. 10 shows an example illustrating a processing flow of the host I/O processing 261 performed by the host 100.

The host 100 receives an I/O request of a specific device file corresponding to the LU of the storage system 130 from the application program executed on the host 100 (step 1001).

The host 100 checks, by referring to the device path management information 251, whether a plurality of paths are set to the device file (multi-path) (step 1002).

If a plurality of paths are not set, the designated device file is made to the target, and if a plurality of paths are set, access target device files are determined based on the condition of each of the paths and priorities of I/O distribution (step 1003). Then, the host 100 converts the device file
determined as the access target, and computes the identifier and the LUN of the corresponding storage system 130 and port 131 (step 1004).

Based on the obtained address information, the host 100 transmits an I/O request of the target device, and, in the case of a normal completion, reports to the application program completion of the I/O request processing (steps 1006 and 1009).

In step 1006, in the case of an abnormal completion, it is checked whether there is an alternative path to the device (step 1007), and if it is, the I/O request is re-transmitted through the path, and if the I/O retrial is successful, completion of the I/O request processing is reported (step 1009).

Also, in step 1007, if an alternative path does not exist, an abnormal completion is reported for the I/O request processing (step 1009).

Second Embodiment

The second embodiment is described with reference to FIGS. 1 through 6, 10, and 12 through 14. Since the first and second embodiments share many common features, only differences between them will be described.

In the second embodiment, first, in the destination storage system 130b, an external device defines that virtualizes a first logical device of a migration source storage system 130a and a second logical device defines corresponding to the external device, so that access target of one or more hosts 100 are switched to the second logical device. Then, after dirty update data which has congested in the disk cache 134 of the migration source storage system 130a is written into the third logical device of the external storage 150, a separate external device virtualizing the third logical device in the migration destination storage system 130b defines, and correlation between the second logical device and the latter external device are switched so that the second logical device is correlated to the latter external device.

The second embodiment has generally the same hardware and software configurations as those of the first embodiment. However, due to differences in device switching procedures, there are differences in three processings, i.e., the device migration instruction processing 241, the device migration processing 222, and the storage I/O processing 221.

Figure 12:
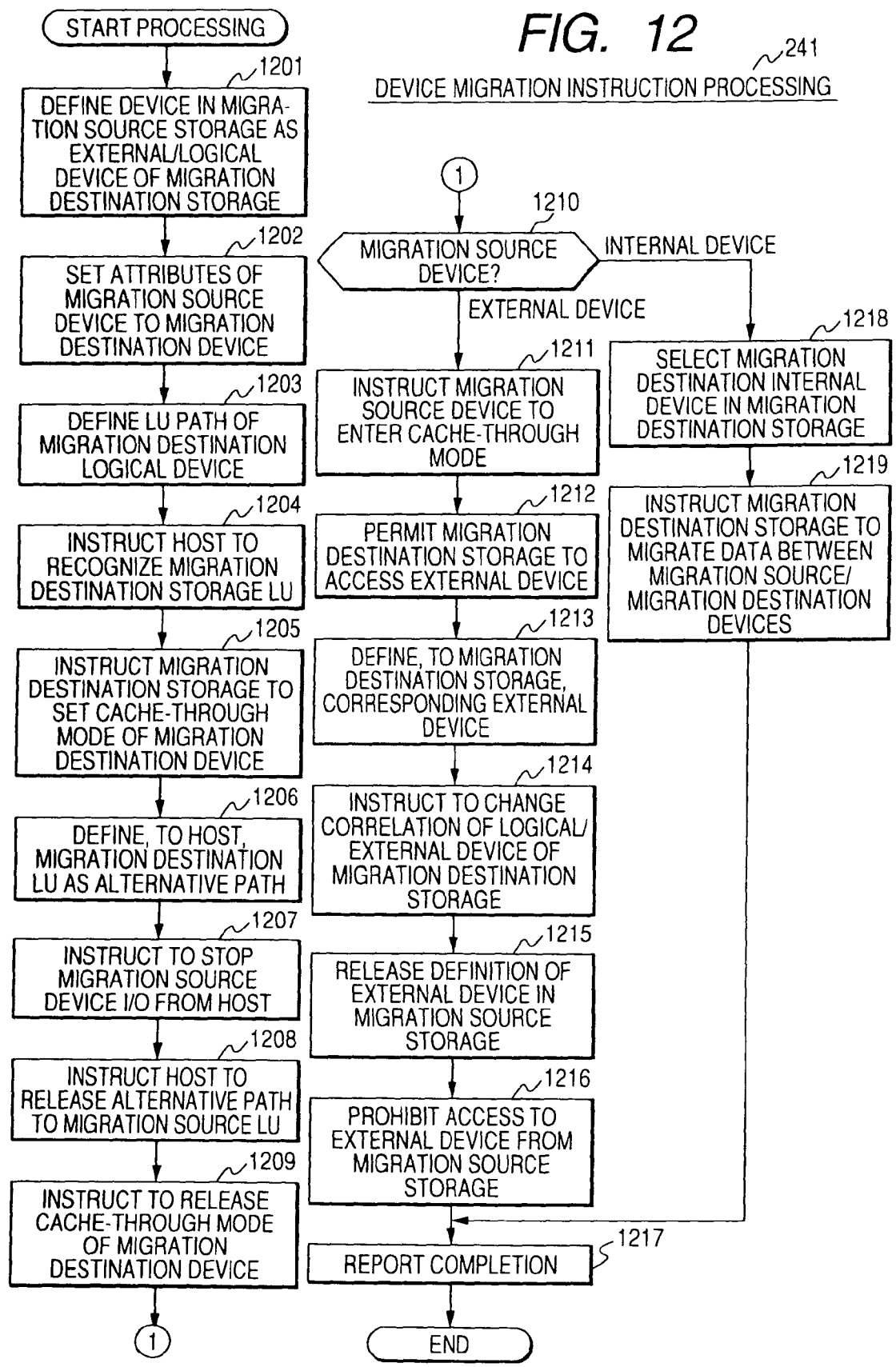
FIG. 12 is a drawing showing an example of processing flow of the device migration instruction processing 241 performed in the management server 110 according to the second embodiment.

FIG. 12 shows a processing flow illustrating the device migration instruction processing 241 performed in the management server 110 in the second embodiment. As in the first embodiment, the management server 110, receiving a device migration request from a user, a management administrator or an application program, first defines the second external device virtualizing a first logical device of the migration source storage system 130a in the migration destination storage system 130b based on parameter information in the migration request. At the same time, in the present step, the management server 110 defines the second logical device corresponding to the second external device (step 1201).

Next, the management server 110 transfers the attributes set in the first logical device in the migration source storage system 130a into the second logical device of the migration destination storage system 130b (step 1202), defines an LU path to the second logical device in the migration destination storage system 130b (step 1203), and forces one or more hosts 100 to recognize the LU (step 1204).

Thereafter, the management server 110 instructs the migration destination storage system 130b to set the cache-through mode of the second logical device (step 1205).

In this state, the management server 110 defines, for the one or more hosts 100, the LU of the migration destination storage system 130b as an alternative path to the target LU of the migration source storage system 130a (step 1206). Furthermore, the management server 110 instructs the migration source storage system 130a to stop
I/O from the one or more hosts 100 to the first logical device (step 1207).

As a result, since the I/O requests from the relevant one or more hosts 100 to the migration source storage system 130a are rejected, subsequent I/O requests are transmitted to the LU of the migration destination storage system 130b to which the alternative path is set.

Furthermore, the management server 110 instructs the one or more hosts 100 to release the path for the LU of the migration source storage system 130*a* from the alternative path, and instructs the migration destination storage system 130*b* to release the cache-through mode of the second logical device (steps 1208 and 1209).

As a result, access target of the one or more hosts 100 can be switched to the LU of the migration destination storage system 130*b*. In the second embodiment, further to this state, the first logical device of the migration source storage system 130*a* is migrated to the second logical device.

First, the management server 110 determines to which the first logical device, being the migration target, corresponds between an external device and a physical device in the migration source storage system 130*a* (step 1210).

If it corresponds to an external device, the management server 110 instructs to set the cache-through mode of the first logical device of the migration source storage system 130*a*, and writes the entire dirty update data to the first logical device, which is stored in the disk cache 134, into the third logical device (in other words, the third logical device of the external storage 150) (step 1211).

After completion of writing the entire dirty update data, the management server 110 instructs the third logical device in the external storage 150 to change the access privilege so that it can be accessed by the migration destination storage system 130*b* (step 1212), defines the third external device virtualizing the third logical device to the migration destination storage system 130*b* (step 1213), and changes the correlations between the second logical device in the migration destination storage system 130*b* and the second external device, thereby correlating the second logical device to the third external device (step 1214).

Thereafter, the management server 110 changes the access privilege so that access from the migration source storage system 130*a* to the third logical device of the external storage 150 is prohibited (step 1216).

After completion of these processings, the management server 110 reports, to the request source, completion of migration request processing of the device (step 1217).

On the other hand, if the first logical device corresponds to a physical device, the management server 110 selects, among the physical devices in the migration destination storage system 130*b*, an unused second physical device not correlated to a logical device, and correlates the second logical device to the second physical device (step 1218). Thereafter, the management server 110 instructs the migration destination storage system 130*b* to migrate the entire data of the first logical device to the second physical device (step 1219).

If it is determined that, from the completion report from the storage system 130*b*, migration of the entire data is complete, the management server 110 reports, to the request source, completion of the processing (step 1217).

Figure 13:
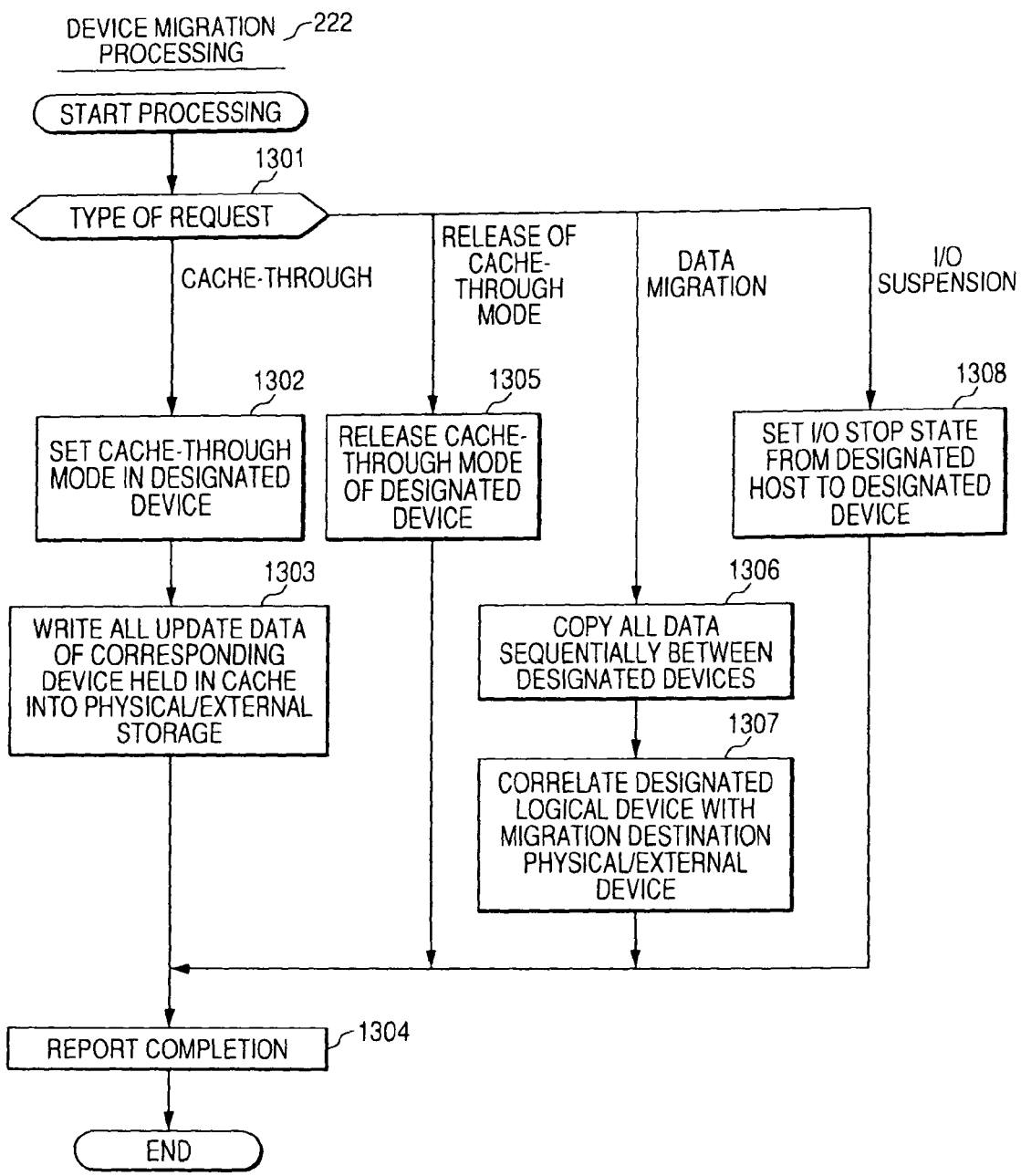
FIG. 13 is a drawing that shows an example of processing flow of the device migration processing 222 performed in the storage system 130 according to the second embodiment.

FIG. 13 shows a processing flow illustrating the device migration processing 222 performed in the storage system 130 in the second embodiment. The storage system 130 checks the contents of the request processing from the management server 110, and, in the case of the cache-through mode set processing, sets the cache-through mode in the logical device as in the first embodiment, and writes the dirty update data with respect to the logical device stored in the disk cache 134 into the physical/external device (steps 1302 and 1303).

In case of the cache-through release instruction processing, the storage system 130 sets the entry 311 of the logical device management information 201 of the designated logical device to "OFF" (step 1305).

In case of the data migration processing, the storage system 130, with respect to the target logical device designated in the parameter information, performs the data migration processing between the migration source physical/external device corresponding to the logical device and an independently designated migration destination physical/external device, and changes the correlation between the logical device and the physical/external device so that the logical device is correlated to the migration destination physical/external device at the time the entire data is completely migrated (steps 1306 and 1307). Specifically, the storage system 130 transfers the migration destination physical/external device number into the entry 303 of the logical device management information 201 corresponding to the logical device, and set the data migration flag at the entry 310 to OFF. Also, the storage system 130 updates entries 503/603 and entries 504/604 of the physical/external device management information 203/204 corresponding to the physical/external device, which are the migration destination and migration source, respectively.

Finally, when the request processing is the I/O stop processing, as in the first embodiment, the storage system 130 updates the control information so that I/O requests from the designated one or more hosts 100 to the target logical device are restricted (step 1308).

Figure 14:
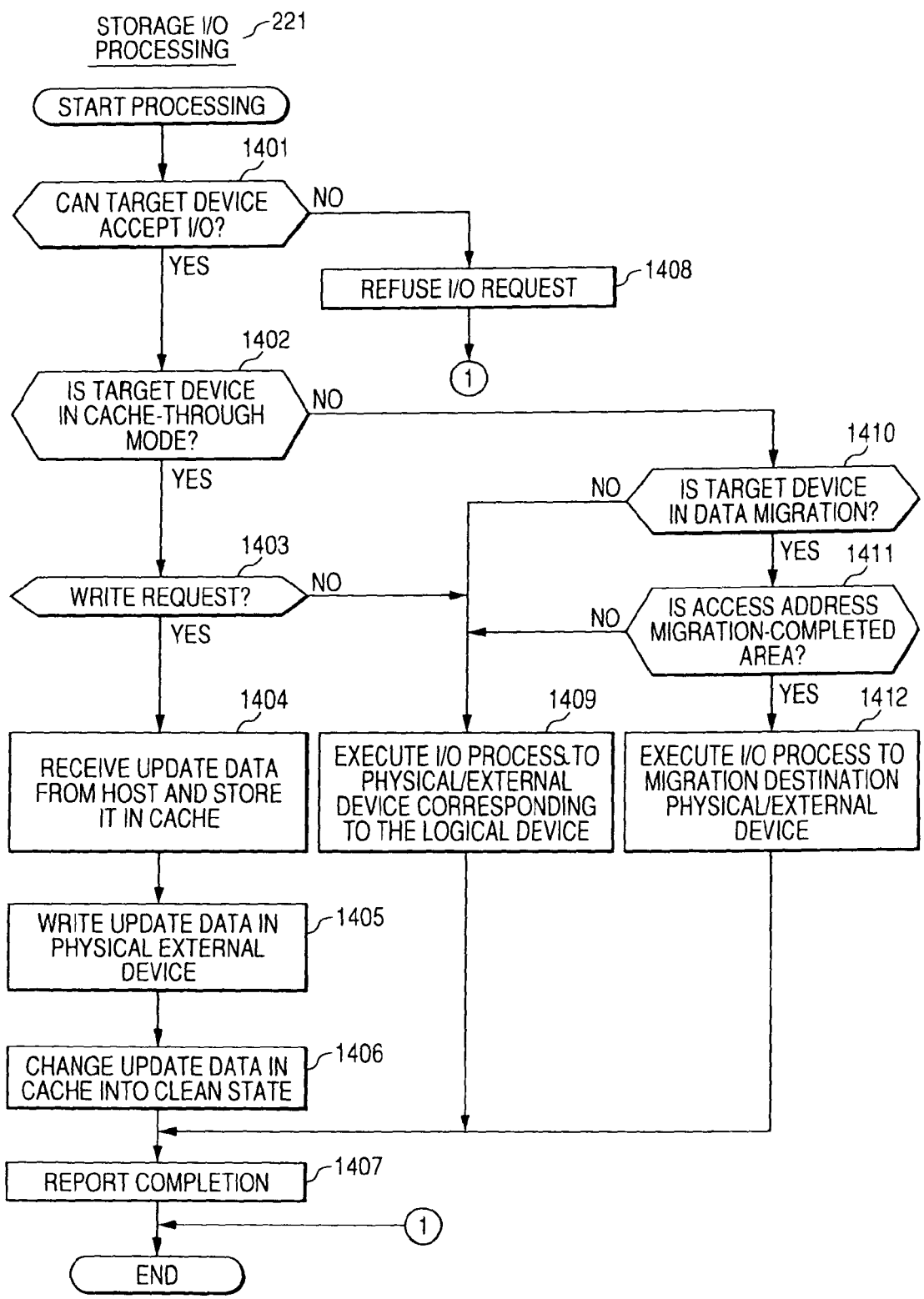
FIG. 14 is a drawing showing an example of processing flow of the storage I/O processing 221 performed in the storage system 130 according to the second embodiment.

FIG. 14 shows an example of a processing flow of the storage I/O processing 221 performed in the storage system 130 in the second embodiment. It is noted that processing of steps 1401 through 1408 is the same as the storage I/O processing of steps 901 through 908 in the first embodiment shown in FIG. 9, description thereof is omitted.

In the second embodiment, if the target logical device is not in the cache-through mode, the storage system 130 performs the I/O request processing to the physical/external device of the migration destination in case the logical device is in data migration and the access address of the I/O request is in the migration-completed area, and performs the I/O request processing to the physical/external device of the migration source in case the target logical device is in data migration and the access address of the I/O request is not in the migration-completed area, i.e., to the physical/external device corresponding to the logical device instantly (steps 1409 to 1412).

According to the present invention, among a plurality of virtualization control storage systems using the external storage connecting technology, virtual device control can be switched to a second virtualization control storage system separate from a first virtualization control storage system, while receiving host I/O requests to a third device of a third storage system which is being virtualized.

In other words, in response to an occurrence of workload imbalance among virtualization control storages due to, for example, I/O load changes of the hosts, and the like, by switching the control responsibility of the virtual device, input/output throughput is equalized and optimized among the virtualization control storage systems. As a result, a mechanism for equalizing the workload during a system operation is implemented, and performance design of a large scale virtual storage system equipped with a large number of devices is simplified.

Figure 11:
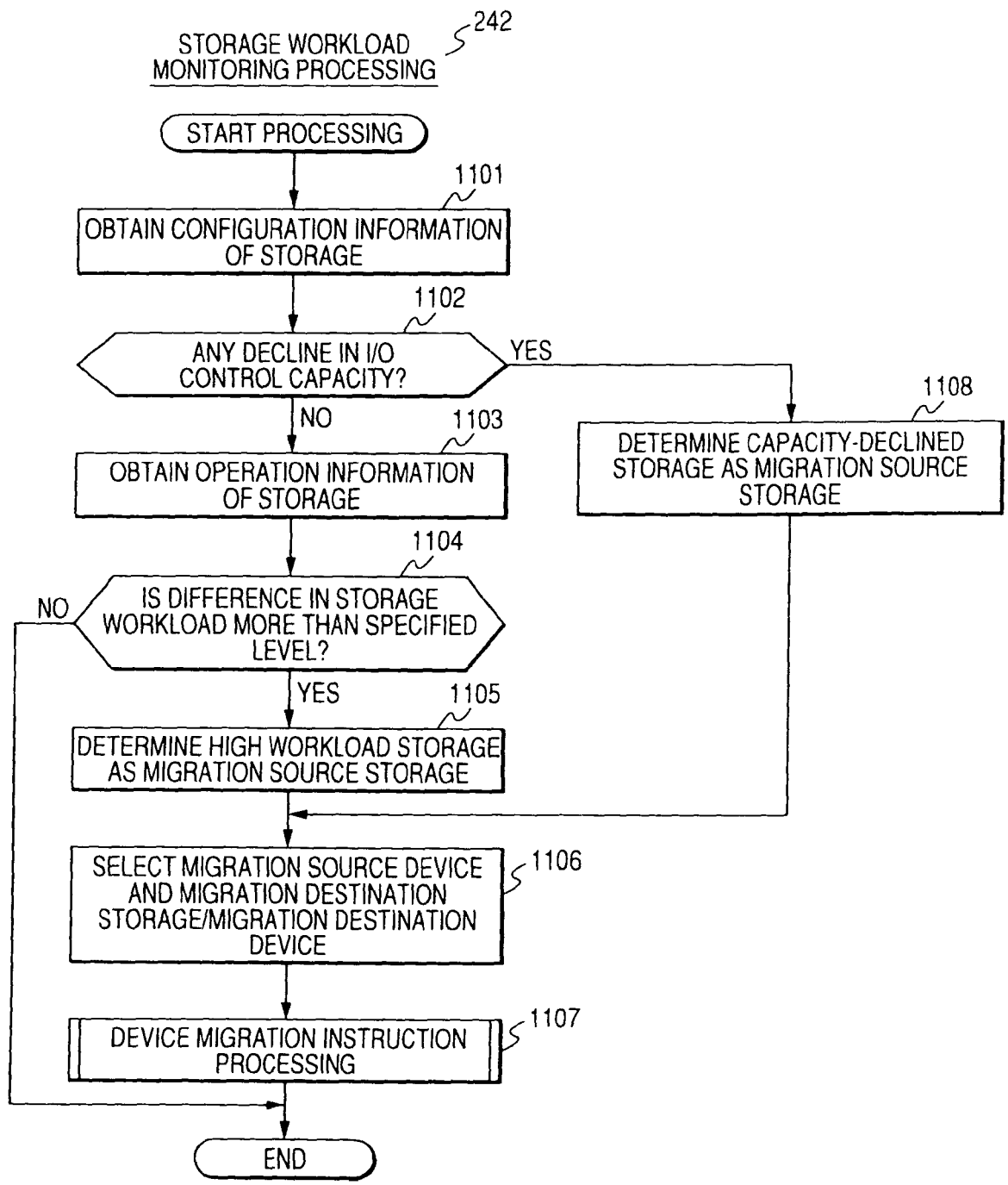
FIG. 11 is a drawing that shows an example of processing flow of the storage workload monitoring processing 242 performed in the management server 110 according to the first or second embodiment.

In the first and second embodiments described above, it is assumed that instructions to migrate devices between the storage systems 130 is designated from a user, a management administrator, or an application program for the logical device and the migration destination storage system 130 which are migration target. Here, referring to FIG. 11, as an example of a selection processing of the migration target device and migration destination storage system 130, a storage workload monitoring processing 242 performed by the management server 110 is described.

The management server 110 periodically obtains configuration information of the storage system 130 through the IP network 175, and checks whether a configuration abnormality has occurred in each of the storage systems 130 (steps 1101 and 1102).

If it is determined that the I/O processing capacity of a specific storage system 130 has decreased due to a fault of the disk cache 134 or the control processor 132, the management server 110 determines the storage system 130 as the migration source storage system 130a (step 1108).

If such storage system 130 is not detected, the management server 110 periodically obtains, from each of the storage systems 130, operation information such as I/O frequency of each of the logical devices, usage rate of each of the control processors 132 or disk caches 134, or the like (step 1103).

If the difference between I/O workloads among storage systems 130 is higher than a specified level, the management server 110 determines the storage system having the higher workload as the migration source storage system 130a (steps 1104 and 1105).

For the migration source storage system 130a determined in step 1105 or 1108, the management server 110 selects the first logical device as the migration source, and further selects the migration destination storage system 130b and the second logical device as the migration destination, thereby requests the device migration to the device migration instruction processing 241 (steps 1106 and 1107). In the present step 1106, in selecting the first logical device for the migration source, conventional selection logics used in data migration for the purpose of the workload equalization between devices in storage systems may be used, for example, selecting a logical device of the higher workload regularly.

In the present invention, the migration process differs depending on whether the logical device corresponds to an external device or to a physical device. When the logical device corresponds to an external device, in addition to writing dirty update data congesting in a cache into a device, the entire data stored in the physical device is not needed to be copied as in a case when the logical device corresponds to a physical device. Accordingly, in selecting the first logical device for the migration source in step 1106, it is preferable to select with priority the logical device corresponding to the external device. Also, if the first logical device of for migration source corresponds to an external device, it is preferable to select the migration destination storage system 130b among the storage systems 130 that are capable of external storage connection to the external storage 150 having the external device.

As described above, through the storage workload monitoring processing 242, when resources such as the cache memory or the control processor in the virtualization control storage system and the like are rendered unusable due to, for example, mechanical faults, or when the I/O processing capacity of the virtualization control storage system has decreased, these conditions are detected. Also, as a result of the detection, virtual device control of the virtualization control storage system is distributed to other virtualization control storage systems, so that I/O processing capacity of the entire storage system is maximumally exploited.

It is noted that the present invention is not limited to the described embodiments, and many variations are conceivable.

In the first and second embodiments of the present invention, the management server 110 instructs the one or more hosts 100, migration source storage system 130a, and the migration destination storage system 130b to perform the migration, and the device migration processing is performed under the control of the management server 110. All aspects of attribute transfers between the migration source storage system 130a and the migration destination storage system 130b, setting of the cache-through mode, and timing of release are controlled by the management server 110. However, some of such processings may be performed by the migration destination storage system 130b instead of the management server 110. For example, the migration destination storage system 130b may receive an instruction to migrate device from the management server 110, and subsequently, for example, obtain the device attributes from the migration source storage system 130a, instructing to set the cache-through mode in the migration source storage system 130a, or the like, through communication between both storage systems.

Also, although the embodiments of the present invention have described the virtual storage system by the storage system 130a adopting the external storage connection technology, an almost similar device migration method may be applicable to a virtual storage system by a virtual switch having the storage virtualization technology.

Figure 15:
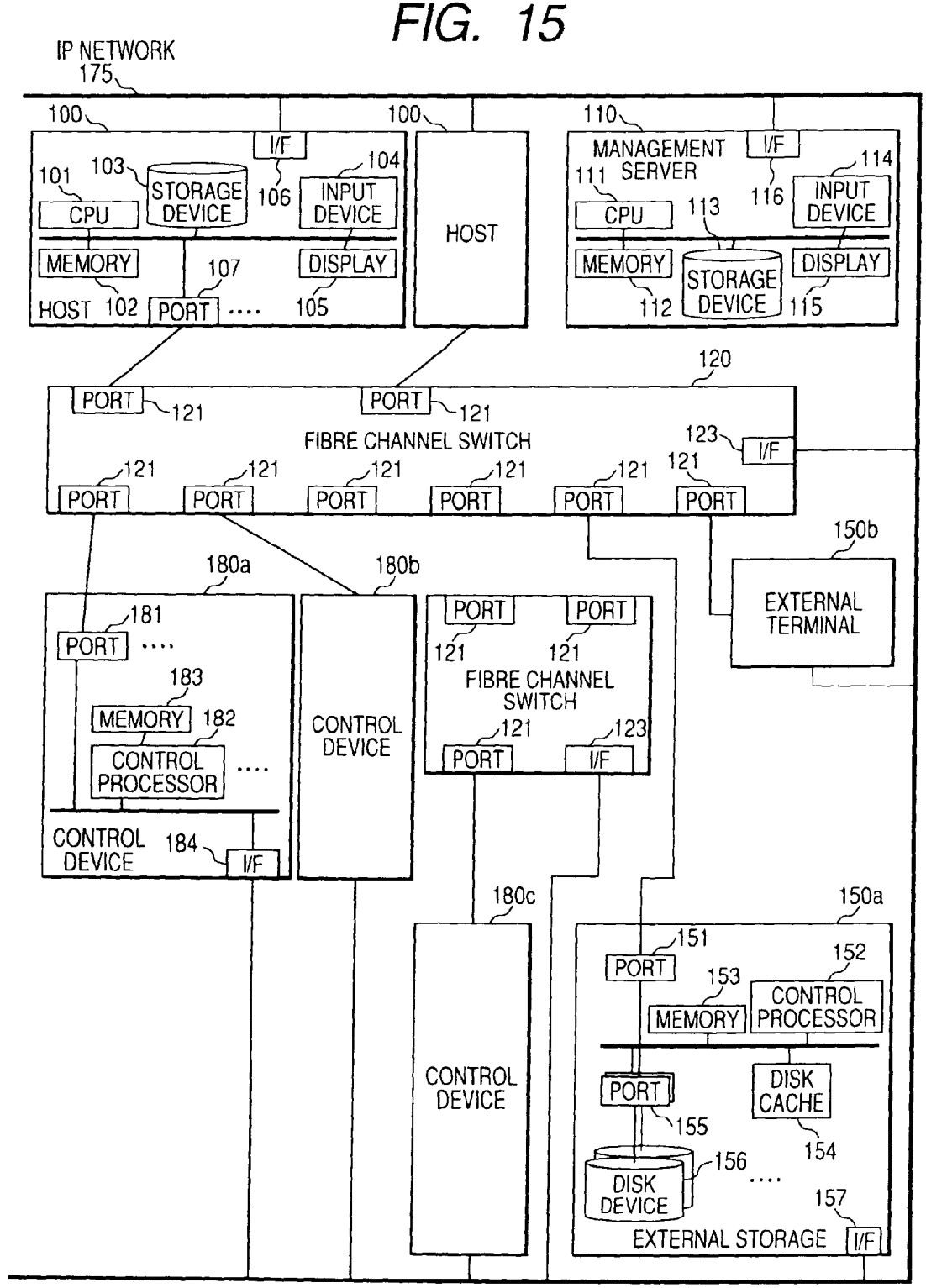
FIG. 15 is a drawing that shows another example of a hardware configuration of the computer system.

FIG. 15 shows a hardware configuration implementing a variation of the present invention. Fibre channel switches 120 in the figure cooperates with control devices 180a and 180b (hereafter collectively referred to as a "control device 180), and provides a virtual device according to the storage virtualization technology. In this instance, a device migration from the control device 180a virtualizing the external storage 150 to the different control device 180b is conceivable. In the present variation of present invention, differing from the virtual storage systems by the storage system 130 described in the first and second embodiments of the present invention, since each of the control devices 180 is not mounted by the disk cache 134, writing the update data of the migration source logical device congesting in the disk cache 134 is not needed. For example, FIG. 16 shows a process flow of the device migration instruction processing 241 performed by the management server 110. In the present variation of the invention, since the update data congesting in the disk cache needs not be considered, device migration between the control devices 180 may be performed merely by an attribution transfer between the devices.

(Supplement)

The management server 110 includes a control section and a communication section. The communication section is connected to a first, a second, and a third storage systems (storage device systems), and the first storage device system provides, as a first storage area in the first storage device system, a third storage area that belongs to the third storage device system to other computers.

In the instance, the control section instructs the second storage device system to change the access privilege so that the third storage area is accessible. Furthermore, the control section instructs the second storage device system to set the second storage area corresponding to the third storage area. Thereafter, the control section instructs the other computers to recognize the second storage area, and to set, as an alternative path to a first path in which input/output requests to the third storage area are performed through the first storage area, a second path in which input/output requests to the third storage area are performed through the second storage area.

Furthermore, the control section instructs the other computers to prohibit input/output requests to the third storage area through the first path.

Also, as another variation of the above-described system, the control section instructs the second storage device system to set the second storage area corresponding to the first storage area. Thereafter, the control section instructs the other computers to recognize the second storage area. Thereafter, the control section instructs the other computers to set, as an alternative to the first path in which an input/output request of the third storage area through the first storage area is accomplished, a third path in which an input/output request of the third storage area is accomplished to the second storage area and the first storage area.

Furthermore, the control section instructs the other computers to prohibit input/output requests to the third storage area through the first path, and instructs the second storage device system to change the access privilege so that access to the third storage area is enabled. Thereafter, the control section instructs the second storage device system to change a correlation of the third storage area to correspond to the second storage area, to provide the third storage area to the other computers as the second storage area.

Furthermore, the above-described computer may select, among a plurality of the first and second storage device systems, a migration source storage device system of the storage area. Specifically, the control section obtains configuration information and operation information of the first and second storage device systems. Furthermore, the control section, based on the obtained configuration information and operation information, transmits a migration instruction which instructs to migrate a storage area belonging to one storage device system to another storage device system.

For example, the control section obtains input/output throughput as configuration information of the first and second storage device systems, and, if input/output throughput of one of the storage device systems does not meet a certain threshold value, according to the above-described migration instruction, determines migration of the storage area from the storage device system. Also, if input/output throughput of each of the storage device systems meets the certain threshold value, the control section obtains input/output frequency to each of the storage device systems from other computers as operation information of the first and second storage device systems. If the input/output frequency to one of the storage device systems is more than the threshold value, according to the above-described migration instruction, the control section determines migration of the storage area from the storage device system.

Here, if either of the first and the second storage device systems provides a storage area of the third storage device system, which is connected to that storage device system, to other computers as a storage area in that storage device system, the control section, in transmitting an instruction to migrate, prioritize the storage area corresponding to the third storage area as a migration target.

According to the present invention, virtualization control storage systems may be replaced or added/re-migrated while the storage system is continuously operated.

Furthermore, in response to, for example, I/O workload variations, and the like, input/output workload between the virtualization control storage systems may be optimized.

What is claimed is:
1. A storage system, comprising:
    a first storage device coupled to a first computer;
    a second storage device coupled to the first computer and a second computer; and
    a third storage device coupled to the first storage device and the second storage device,
    wherein the first storage device comprises a first logical device, the second storage device comprises a second logical device, and the third storage device comprises a third logical device,
    wherein the third logical device is associated with a physical storage area storing data used by the first computer,
    wherein the first storage device comprises a first virtualization unit and the second storage device comprises a second virtualization unit,
    wherein the first virtualization unit of the first storage device associates the third logical device of the third storage device with the first logical device, and provides the third logical device to the first computer as the first logical device of the first storage device,
    wherein when the second storage device receives from the second computer an instruction to migrate the first logical device of the first storage device to the second storage device, the second virtualization unit of the second storage unit associates the first logical device with the second logical device, acquires attribute information set for the first logical device from the first storage device, sets the acquired attribute information to the second logical device, and provides the second logical device of the second storage device, said second logical device virtualizing the first logical device, to the first computer,
    wherein when an access path to the second logical device of the second storage device is set as an alternative path to an access path to the first logical device of the first storage device in the first computer, the first storage device stops receiving an input/output request from the first computer so that the input/output request is transmitted from the first computer to the second logical device of the second storage device, and
    wherein the second virtualization unit of the second storage device associates the third logical device of the third storage device with the second logical device, and provides the third logical device to the first computer as the second logical device of the second storage device.

2. The storage system according to claim 1, wherein the attribute information is at least one of:
    access control information specifying that the access to the first logical device is limited to be allowed to a particular first computer;
    access attribute information specifying limitation of a read access or a write access to the first logical device; and
    encryption setting information specifying whether an encryption method is applied to data of the first logical device or not.

3. The storage system according to claim 1, wherein the access attribute information further includes information indicating time, date and term of setting the access attribute information.

4. The storage system according to claim 1,
    wherein the second storage device further includes a cache for storing data which is transmitted or received to/from the first computer,
    wherein the second storage device sets an operation mode of the second logical device to a cache-through mode when the first logical device is provided to the first computer as the second logical device, and
    wherein after the first storage device has stopped receiving the input/output request from the first computer, the second storage device releases the cache-through mode set to the second logical device.

5. The storage system according to claim 1,
wherein the first storage device further includes a cache for storing data which is transmitted or received to/from the first computer,
wherein when an access path to the second logical device of the second storage device is set as an alternative path to an access path to the first logical device of the first storage device in the first computer, the first storage device sets an operation mode of the first logical device to a cache-through mode and writes update data stored in the cache but not written in the third logical device into the third logical device, and
wherein after completion of the writing of the update data into the third logical device, the first storage device stops accessing the third logical device.

6. The storage system according to claim 5, wherein when the first storage device completes writing of the update data into the third logical device, the third storage device changes an access right such that the second storage device can access the third logical device, and prohibits access to the third logical device from the first storage device.

7. The storage system according to claim 5, wherein after the first storage device has stopped receiving the input/output request from the first computer, the first storage device sets an operation mode of the first logical device to a cache-through mode.

8. A method of migration of logical device in a storage system including a first storage device coupled to a computer and having a first logical device, a second storage device having a second logical device and a third storage device having a third logical device associated with a physical storage area storing data used by the computer, the method comprising the steps of:
associating, by the first virtualization unit of the first storage device, the third logical device of the third storage device with the first logical device, and providing the third logical device to the computer as the first logical device of the first storage device;
receiving, by the second storage device, an instruction to migrate the first logical device of the first storage device to the second storage device;
acquiring, by the second storage device, attribute information set for the first logical device from the first storage device, and setting the acquired attribute information to the second logical device;
associating, by the second storage device, the first logical device with the second logical device, and providing the second logical device of the second storage device said second logical device virtualizing the first logical device, to the first computer;
when an access path to the second logical device of the second storage device is set as an alternative path to an access path to the first logical device of the first storage device in the computer, stopping, by the first storage device, a reception of an input/output request from the computer so that the input/output request is transmitted from the computer to the second logical device of the second storage device; and
associating, by the second storage device, the third logical device of the third storage device with the second logical device, and providing the third logical device to the computer as the second logical device of the second storage device.

9. The method according to claim 8, wherein the attribute information is at least one of:
access control information specifying that the access to the first logical device is limited to be allowed to a particular computer;
access attribute information specifying limitation of a read access or a write access to the first logical device; and
encryption setting information specifying whether an encryption method is applied to data of the first logical device or not.

10. The method according to claim 9, wherein the access attribute information further includes information indicating time, date and term of setting the access attribute information.

11. The method according to claim 8, wherein the second storage device further includes a cache for storing data which is transmitted or received to/from the computer,
wherein the second storage device sets an operation mode of the second logical device to a cache-through mode when the first logical device is provided to the computer as the second logical device, and
wherein after the first storage device has stopped receiving the input/output request from the computer, the second storage device releases the cache-through mode set to the second logical device.

12. The method according to claim 8, wherein the first storage device further includes a cache for storing data which is transmitted or received to/from the computer,
wherein when an access path to the second logical device of the second storage device is set as an alternative path to an access path to the first logical device of the first storage device in the computer, the first storage device sets an operation mode of the first logical device to a cache-through mode and writes update data stored in the cache but not written in the third logical device into the third logical device, and
wherein after completion of the writing of the update data into the third logical device, the first storage device stops accessing the third logical device.

13. The method according to claim 12, wherein when the first storage device completes writing of the update data into the third logical device, the third storage device changes an access right such that the second storage device can access the third logical device, and the third storage device prohibits access to the third logical device from the first storage device.

14. The method according to claim 12, wherein after the first storage device has stopped receiving the input/output request from the computer, the first storage device sets an operation mode of the first logical device to a cache-through mode.

* * * * *